(12) United States Patent
Sasakura et al.

(10) Patent No.: US 7,555,286 B2
(45) Date of Patent: Jun. 30, 2009

(54) AUTHENTICATION CARD AND WIRELESS AUTHENTICATION SYSTEM PERFORMING MUTUAL AUTHENTICATION BY MEANS OF THE AUTHENTICATION CARD

(75) Inventors: Toyoki Sasakura, Tokyo (JP); Kenichi Miyamoto, Tokyo (JP)

(73) Assignee: Super Wave Corporation, Tokyo (JP)

( * ) Notice: Subject to any disclaimer, the term of this patent is extended or adjusted under 35 U.S.C. 154(b) by 427 days.

(21) Appl. No.: 11/224,068

(22) Filed: Sep. 13, 2005

(65) Prior Publication Data

US 2006/0003739 A1 Jan. 5, 2006

Related U.S. Application Data

(63) Continuation of application No. PCT/JP03/03574, filed on Mar. 25, 2003.

(51) Int. Cl.
*H04M 1/66* (2006.01)
(52) U.S. Cl. .............. 455/411; 455/420; 455/558; 340/539.1; 340/539.14; 340/539.19
(58) Field of Classification Search ............. 455/435.1, 455/558, 41.2, 418–420, 410–411, 423–425; 340/539.1, 539.11, 539.14, 531, 539.19, 340/539.21
See application file for complete search history.

(56) References Cited

U.S. PATENT DOCUMENTS

| 4,871,997 | A | | 10/1989 | Adriaenssens et al. |
| 5,396,218 | A | | 3/1995 | Olah |
| 5,715,518 | A | * | 2/1998 | Barrere et al. ............ 340/5.8 |
| 5,757,271 | A | | 5/1998 | Andrews |
| 5,796,338 | A | | 8/1998 | Mardirossian |
| 6,151,493 | A | | 11/2000 | Sasakura et al. |

(Continued)

FOREIGN PATENT DOCUMENTS

EP 0 838 908 A2 4/1998

(Continued)

OTHER PUBLICATIONS

Supplementary European Search Report dated Feb. 28, 2006 for European Application Patent No. 03712886.5-2210 (PCT/JP0303574).

(Continued)

*Primary Examiner*—George Eng
*Assistant Examiner*—Brandon J Miller
(74) *Attorney, Agent, or Firm*—Staas & Halsey LLP

(57) ABSTRACT

The present invention provides an authentication card inserted to a portable device. The authentication card 1 is inserted (installed) in a cellular phone 30 and the authentication card 2 is inserted (installed) in a PDA 40. The authentication card 1 comprises an identification code transmission unit 10 and the authentication card 2 comprises a usage restriction cancellation unit 20. The units 10 and 20 exchange the identification code by means of wireless signal and mutually authenticate the identification code mutually. In case that the PDA 40 is moved more than the predetermined distance from the cellular phone 30 and the reception level of signal from the unit 10 received by the unit 20 is smaller than the predetermined value, or the unit 20 can not authenticate the identification code of the unit 10, the unit 20 stops transmission of the usage restriction cancellation signal to the PDA 40.

15 Claims, 18 Drawing Sheets

U.S. PATENT DOCUMENTS

| | | | |
|---|---|---|---|
| 6,868,282 B2* | 3/2005 | Carlsson | 455/558 |
| 2002/0059530 A1* | 5/2002 | Talvitie | 713/201 |
| 2002/0147922 A1 | 10/2002 | Hartinger et al. | |
| 2003/0174839 A1 | 9/2003 | Yamagata et al. | |
| 2004/0142684 A1* | 7/2004 | Ratert et al. | 455/420 |
| 2004/0180657 A1* | 9/2004 | Yaqub et al. | 455/435.1 |

FOREIGN PATENT DOCUMENTS

| | | |
|---|---|---|
| EP | 1 164 555 A2 | 12/2001 |
| JP | 2-21389 | 1/1990 |
| JP | 10-290285 | 10/1998 |
| JP | 11-88499 | 3/1999 |
| JP | 11-191797 | 7/1999 |
| JP | 2001-266098 | 9/2001 |
| JP | 2002-32141 | 1/2002 |
| JP | 2003-16418 | 1/2003 |

OTHER PUBLICATIONS

PCT International Preliminary Report issued Dec. 8, 2005 for related International Application No. PCT/JP2003/003574.

Japanese Office Action issued on Nov. 18, 2008 in corresponding Japanese Patent Application 2004-569922.

Office Action mailed on Aug. 19, 2008 and issued in corresponding Japanese Patent Application No. 2004-569922.

* cited by examiner

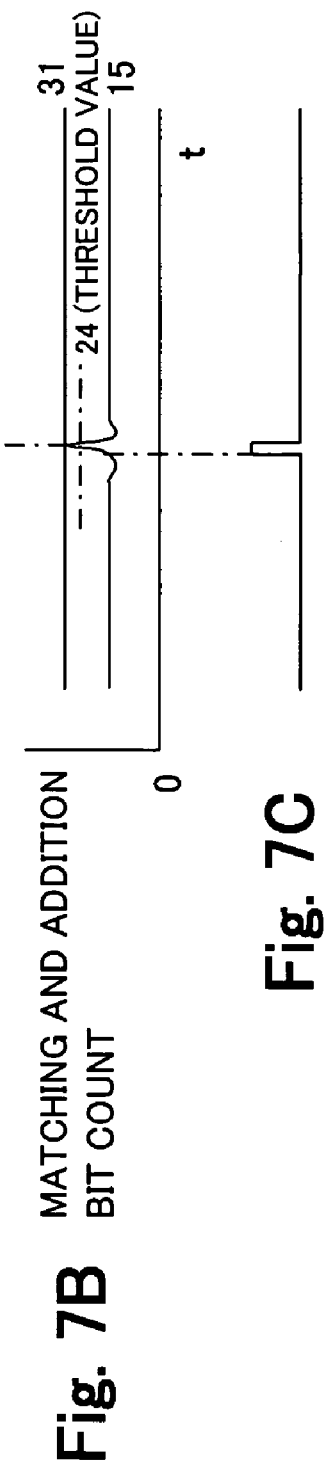

WAVE DETECTION WAVEFORM OF RECEPTION SIGNAL

WAVEFORM AFTER THRESHOLD VALUE PROCESSING

CONFIRMATION SIGNAL

|← 9.1ms →|← 2.9ms →|
M SEQUENCE CODE (31 BITS)   TELEPHONE NUMBER CODE (29 BITS)

RECEPTION SIGNAL LEVEL VR

AUTHENTICATION CARD AND WIRELESS AUTHENTICATION SYSTEM PERFORMING MUTUAL AUTHENTICATION BY MEANS OF THE AUTHENTICATION CARD

CROSS-REFERENCE TO RELATED APPLICATIONS

This application is a continuation of international application PCT/JP2003/03574, filed on Mar. 25, 2003, now pending, herein incorporated by reference.

TECHNICAL FIELD

The present invention relates to an authentication card that is installed in a portable apparatus that is carried by the owner and which performs wireless authentication for a device authentication card that is installed in another device. Further, the present invention relates to an authentication card that is installed in devices including information devices, home electronic locks, and automobile electronic locks and which performs wireless authentication for a portable authentication card that is installed in a portable apparatus that is carried by the owner. In addition, the present invention relates to a wireless authentication system in which a first authentication card that is installed in a portable apparatus carried by the owner and a second authentication card that is installed in a device perform mutual authentication.

BACKGROUND ART

In recent years, portable information devices such as PDAs (Personal Digital Assistants) and notebook computers have come into widespread use. Such portable information devices store multiple information such as information on the individual using the portable information device and information on the company to which the individual belongs.

Therefore, in cases where such portable information devices are transferred to a third party as a result of being lost, mislaid, or stolen, it is undesirable for the third party to know the stored information and the demand for preventing such an occurrence is strong.

Further, as in the case of keyless entry for an automobile, when a door lock is locked or canceled wirelessly by using radio waves instead of using a key, the user carries a portable apparatus that is equivalent to an automobile key and operates the locking or unlocking of the automobile door lock remotely by means of a wireless signal by using the portable apparatus.

In the case of such a keyless entry system, when a door is locked or unlocked easily by means of a portable apparatus or the like owned by a third party, it is undesirable for the third party to assume ownership of the automobile or easily steal or commit mischief with the vehicle and so forth.

Hence, in cases where an automobile door lock apparatus or other apparatus is operated wirelessly, there is a requirement to prevent takeover of ownership or illegal operation and to render the security reliable.

Such takeover of ownership and illegal operation are not limited to an automobile door lock and, in addition to the above PDA (Personal Digital Assistant) and notebook computers, there is a requirement to similarly prevent takeover of ownership and illegal operation for portable apparatuses that remotely monitor and operate devices such as house door locks and camera and so forth. Therefore, there is similarly a need for reliable security in cases where such devices are remotely monitored and operated and so forth wirelessly.

On the other hand, memory cards (memory stick, SD memory cards (registered trademark) and multimedia cards and so forth) that can be optionally inserted in portable apparatuses have become widespread in recent years and portable apparatuses that allow such cards to be inserted have also started to become widespread.

By providing such a memory card with a function serving to render the security reliable, it is thought that the user will be able to obtain highly accurate security simply by using a cellular phone or the like that he or she already owns.

DISCLOSURE OF THE INVENTION

The present invention provides an authentication card that is installed in a portable apparatus that is carried by the owner and which performs wireless authentication for a device authentication card that is installed in another device. Further, the present invention provides an authentication card that is installed in devices including information devices, home electronic locks, and automobile electronic locks and which performs wireless authentication for a portable authentication card that is installed in a portable apparatus that is carried by the owner.

The authentication card according to a first aspect of the present invention is an authentication card that is installed in a portable apparatus that is carried by an owner and which performs wireless authentication for a device authentication card that is installed in another device, comprising a storage portion for storing call signal data, the identification code of the authentication card, and the identification code of the device authentication card; a transmission portion that transmits the call signal that is stored in the storage portion or the call signal and the identification code of the authentication card stored in the storage portion by means of a wireless signal of a predetermined transmission level; a reception portion for receiving the identification code of the device authentication card transmitted by means of a wireless signal from the device authentication card in response to the transmission of the transmission portion; a judgment portion for judging whether the reception level of the identification code received by the reception portion is equal to or more than a predetermined value and for judging whether the identification code received by the reception portion and the identification code of the device authentication card stored in the storage portion match; and a warning portion that outputs a warning signal to the portable apparatus when, as a result of the judgment by the judgment portion, the reception level of the identification code received by the reception portion is smaller than the predetermined value or the identification code received by the reception portion and the identification code of the device authentication card stored in the storage portion do not match.

According to a first aspect of the present invention, a warning signal is transmitted to a portable apparatus in a case where the reception level of the identification code received by the reception portion of the authentication card is smaller than a predetermined value or in a case where there is no match between the identification code received by the reception portion and the identification code of the device authentication card that is stored in the storage portion. That is, the warning signal is supplied to the portable apparatus in a case where the device authentication card (and the device in which the authentication card is installed) moves far away from the authentication card and the reception level is weak and in a case where the authentication card is unable to authenticate the device authentication card. As a result, the owner of the portable apparatus is able to immediately know about the loss or theft or the like of the device.

Preferably, the authentication card further comprises a connection portion that forms an electrical connection with the portable apparatus as a result of being installed in the portable apparatus, renders the level of a predetermined signal of the portable apparatus a first level by forming the electrical connection and renders the level of the predetermined signal a second level as a result of being removed from the portable apparatus and the electrical connection being broken, wherein the portable apparatus puts the portable apparatus in an unusable state by making the level of the predetermined signal the second level.

The authentication card according to a second aspect of the present invention is an authentication card that is installed in devices including information devices, home electronic locks, and automobile electronic locks and which performs wireless authentication for a portable authentication card that is installed in a portable apparatus that is carried by the owner, comprising a storage portion for storing call signal data, the identification code of the authentication card, and the identification code of the portable authentication card; a reception portion for receiving a wireless signal from the portable authentication card; a first judgment portion for performing a first judgment to judge whether the reception portion receives a wireless signal within a predetermined time, a second judgment to judge whether, when the reception portion receives a wireless signal within the predetermined time, a signal matching the call signal stored in the storage portion is contained in the wireless signal, and a third judgment to judge whether the reception level of the wireless signal is equal to or more than a predetermined level; and a signal output portion for outputting, to the device, a signal to put the device in an unusable state when, as a result of the judgment by the first judgment portion, at least one of the first to third judgments is not established.

According to the second aspect of the present invention, in cases where the reception portion does not receive a wireless signal within a predetermined time or when the reception portion receives a wireless signal in a predetermined time, when a signal matching the call signal stored in the storage portion is not contained in the wireless signal or when the reception level of the wireless signal is lower than a predetermined level, the signal affording the device an unusable state is outputted to the device. As a result, in cases where the device is moved away from the portable apparatus as a result of being mislaid, lost or stolen, and so forth, when the device is unable to authenticate the portable apparatus, the device becomes immediately unusable and the flow of information stored in the device to a third party is prevented.

Preferably, the authentication card further comprises a connection portion that forms an electrical connection with the device as a result of being installed in the device, renders the level of a predetermined signal of the device a first level by forming the electrical connection and renders the level of the predetermined signal a second level as a result of being removed from the device and the electrical connection being broken, wherein the device is put in an unusable state by the device as a result of the level of the predetermined signal assuming the second level.

A wireless authentication system according to a third aspect of the present invention comprises a first authentication card that is installed in a portable apparatus carried by an owner and a second authentication card that is installed in another device and in which the first and second authentication cards perform mutual authentication, wherein the first authentication card comprises a first storage portion for storing call signal data, a first identification code of the first authentication card and a second identification code of the second authentication card; a first transmission portion for transmitting the call signal stored in the first storage portion or the call signal and first identification code stored in the storage portion by means of a wireless signal of a predetermined transmission level; a first reception portion for receiving the identification code of the second authentication card transmitted by means of a wireless signal from the second authentication card in response to the transmission of the first transmission portion; a first judgment portion for judging whether the reception level of the identification code received by the first reception portion is equal to or more than a predetermined value and for judging whether the identification code received by the first reception portion and the second identification code stored in the storage portion match; and a warning portion for outputting a warning signal to the portable apparatus when, as a result of the judgment by the first judgment portion, the reception level of the identification code received by the first reception portion is smaller than the predetermined value or the identification code received by the first reception portion and the second identification code stored in the storage portion do not match, wherein the second authentication card comprises a second storage portion for storing call signal data, the second identification code of the second authentication card, and the first identification code of the first authentication card; a second reception portion for receiving a wireless signal from the first authentication card; a second judgment portion for performing a first judgment to judge whether the second reception portion receives a wireless signal within a predetermined time, a second judgment to judge whether, when the second reception portion receives a wireless signal within the predetermined time, a signal matching the call signal stored in the second storage portion is contained in the wireless signal, and a third judgment to judge whether the reception level of the wireless signal is equal to or more than a predetermined level; and a signal output portion for outputting, to the device, a signal to put the device in an unusable state when, as a result of the judgment by the second judgment portion, at least one of the first to third judgments is not established.

BRIEF DESCRIPTION OF THE DRAWINGS

FIG. 7 is an explanatory view of a pulse compression signal and pulse compression processing;

BEST MODE FOR CARRYING OUT THE INVENTION

Figure 1:
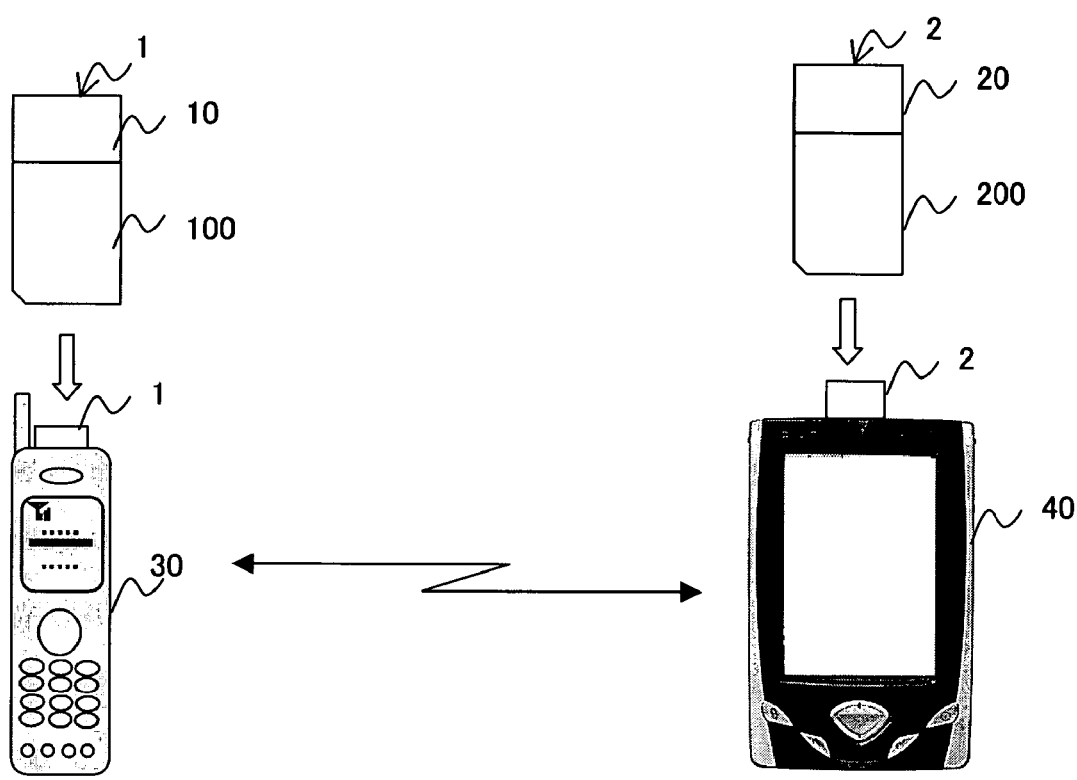
FIG. 1 shows a usage example of an authentication card of the embodiment of the present invention.

FIG. 1 shows a usage example of an authentication card of the embodiment of the present invention. Authentication cards include a parent authentication card 1 and a child authentication card 2 and, in FIG. 1, the parent authentication card 1 is inserted (installed) in a cellular phone 30 and the child authentication card 2 is inserted (installed) in a PDA (Personal Digital Assistant) 40 as an example of a portable information device.

Slots for inserting the authentication cards 1 and 2 are provided in the cellular phone 30 and PDA 40 respectively. Further, the owner of the cellular phone 30 and PDA 40 is generally the same person.

The authentication card 1 has an identification code transmission unit (key module) 10 comprising a wireless communication function installed in or built into a memory card (memory stick, multimedia card, or SD memory card (registered trademark) or the like, for example) 100. The authentication card 2 likewise has a usage restriction cancellation unit (base module) 20 with a wireless communication function installed in or built into a memory card 200.

The authentication cards 1 and 2 wirelessly exchange and mutually authenticate identification information mutually at regular time intervals (at one second or two second intervals or the like, for example) by means of an identification code transmission unit (referred to hereinafter simply as the 'transmission unit') 10 comprising the wireless communication function and the usage restriction cancellation unit (referred to hereinafter simply as the 'cancellation unit') 20.

When the distance between the two authentication cards 1 and 2 is within a predetermined distance (two to three meters, for example), the two authentication cards 1 and 2 are able to perform mutual authentication and, as a result of this mutual authentication, the cancellation unit 20 of the authentication card 2 cancels the usage restriction of the PDA 40 and affords the PDA 40 a usable state. As a result, the owner is able to use the PDA 40.

On the other hand, in cases where mutual authentication is not performed because the PDA 40 in which the authentication card 2 is inserted is lost, mislaid or stolen, or the like, for example, is moved more than the predetermined distance from the authentication card 1 or the identification information that is exchanged between the authentication cards 1 and 2 does not match, the cancellation unit 20 of the authentication card 2 implements usage restrictions for the PDA 40 to render the PDA 40 unusable. Such unusable states include, for example, states where the content of the memory of the PDA 40 is erased, the power supply of the PDA 40 enters an OFF state and cannot be turned ON, and an input cannot be received. As a result, the flow of information stored in the PDA 40 to a third party is prevented.

In cases where mutual authentication is not performed because the authentication card 1 is moved more than the predetermined distance away from the authentication card 2 or because identification information does not match, a warning is issued via the cellular phone 30 and the owner of the cellular phone 30 learns that the PDA 40 is the predetermined distance or more away from the cellular phone 30 (authentication card 2). As a result, the owner is made immediately aware that the PDA 40 is no longer in their possession as a result of being lost, mislaid or stolen.

Further, when the authentication card 1 is removed from the cellular phone 30, the cellular phone 30 establishes an unusable state for itself. Such unusable states include, for example, states where the power supply of the cellular phone 30 enters an OFF state and cannot be turned ON, and an input cannot be received. Similarly when the authentication card 2 is removed from the PDA 40, the identification information that is exchanged between the authentication cards 1 and 2 does not match, the cancellation unit 20 of the authentication card 2 implements usage restrictions for the PDA 40 to render the PDA 40 unusable. Such unusable states include, for example, states where the content of the memory of the PDA 40 is erased, the power supply of the PDA 40 enters an OFF state and cannot be turned ON, and an input cannot be received. As a result, the flow of information stored in the PDA 40 to a third party is prevented.

In cases where mutual authentication is not performed because the authentication card 1 is moved more than the predetermined distance away from the authentication card 2 or because identification information does not match, a warning is issued via the cellular phone 30 and the owner of the cellular phone 30 learns that the PDA 40 is the predetermined distance or more away from the cellular phone 30 (authentication card 2). As a result, the owner is made immediately aware that the PDA 40 is no longer in their possession as a result of being lost, mislaid or stolen.

Further, when the authentication card 1 is removed from the cellular phone 30, the cellular phone 30 establishes an unusable state for itself. Such unusable states include, for example, states where the power supply of the cellular phone 30 enters an OFF state and cannot be turned ON, and an input cannot be received. Similarly when the authentication card 2 is removed from the PDA 40, the PDA 40 establishes an unusable state for itself. Such unusable states include, for example, states where the content of the memory of the PDA 40 is erased, the power supply of the PDA 40 enters an OFF state and cannot be turned ON, and an input cannot be received.

Thus, the authentication card 2 also functions as a usage restriction cancellation apparatus (or usage restriction apparatus) for the PDA 40 while functioning as an additional memory, which is an original function of a memory card. Further, the authentication card 1 also functions as a communication device for communicating the loss or the like of the PDA 40 and as a usage restriction apparatus (or usage restriction cancellation apparatus) for the cellular phone 30 while functioning as an additional memory card.

Of the authentication cards 1 and 2, part of the memory cards 100 and 200 has the same constitution as a normal memory card and is not described here. Details on the transmission unit 10 and cancellation unit 20 will be described hereinbelow divided between the first and second embodiments.

First Embodiment

Figure 2:
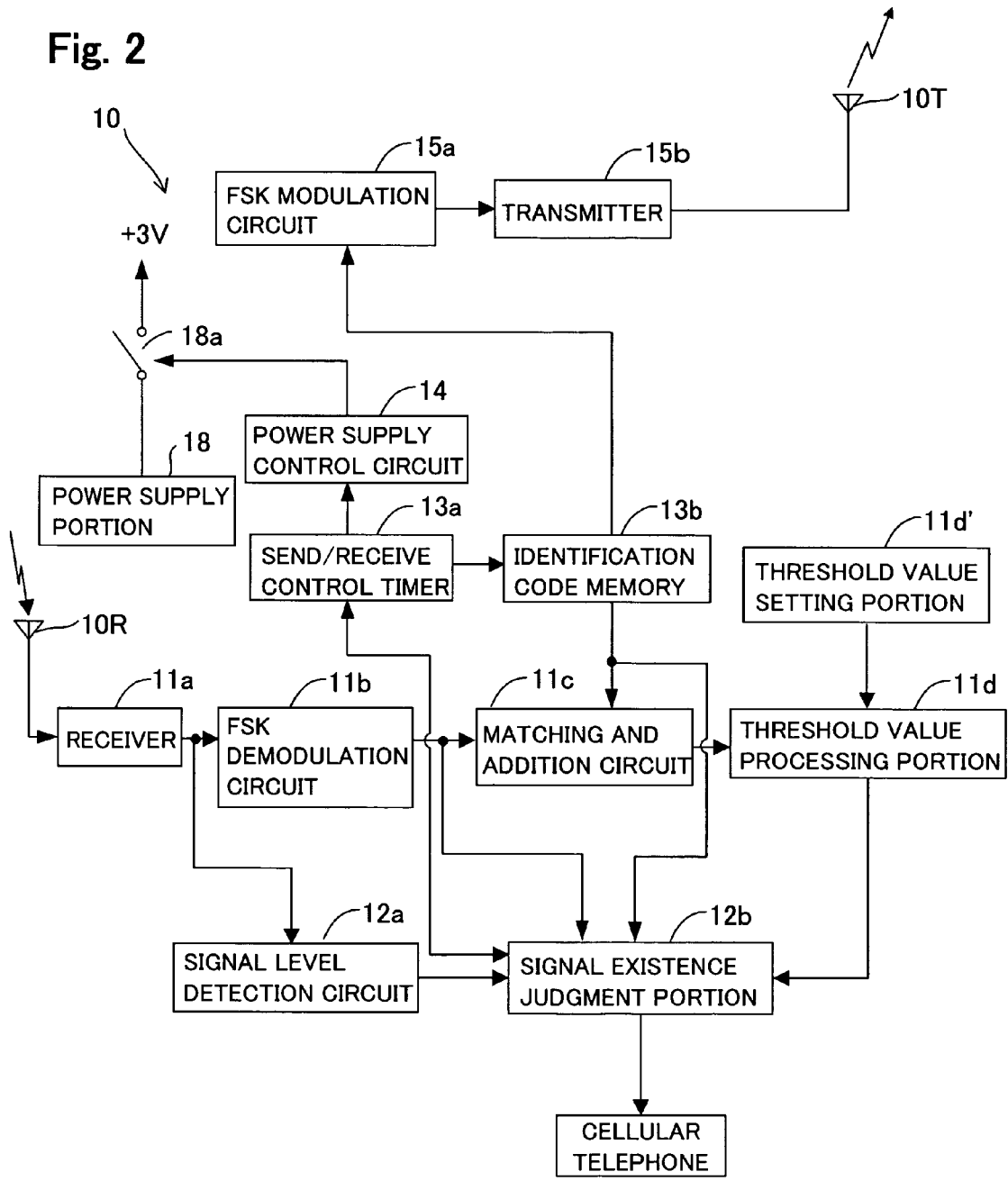
FIG. 2 is a block diagram showing a detailed constitution of the transmission unit.

FIG. 2 is a block diagram showing a detailed constitution of the transmission unit 10. The transmission unit 10 operates when, as a result of the authentication card 1 being inserted in the cellular phone 30, power is supplied by the power supply unit of the cellular phone 30 (battery pack and power regulator) 18 (or a power supply unit in cases where the memory card 100 comprises such a power supply unit).

The transmission unit 10 comprises a transmitter 15*b* that transmits an identification signal that includes a preset unique code signal from a transmission antenna 10T and a receiver 11*a* that receives a confirmation signal that is sent by the transmitter of the cancellation unit 20 (described subsequently) via a reception antenna 10R.

The transmission system for transmitting the identification code sends the identification code set for an identification code memory 13*b* by means of an instruction of a send/receive control timer 13*a* and, after performing FSK modulation (250 MHz) by means of a propagation wave by means of an FSK modulation circuit 15*a*, sends the transmission signal of the identification code from the transmitter 15*b*.

Further, a power supply control circuit 14 turns a switch 18*a* ON and OFF in accordance with the instruction of the send/receive control timer 13*a* and the power from a power supply unit 18 of the cellular phone 30 is supplied to the transmission unit 10 only at the time of signal transmission (normal power is supplied by the power supply unit 18 to the send/receive control timer 13*a*). It is thus possible to reduce the power consumption of the power supply unit 18 of the cellular phone 30 or the memory card 100.

The reception system, which receives a confirmation signal from the cancellation unit 20, has the following constituent elements connected after the receiver 11*a*. First, the received confirmation signal (250 MHz) is FSK-demodulated by means of an FSK demodulation circuit 11*b* and then sent to the matching and addition circuit 11*c*. Further, the matching and addition circuit 11*c* reads the identification signal that is pre-stored in the identification code memory 13*b* and performs addition processing on matching points of each bit of the identification signal in order to judge whether the confirmation signal matches the identification signal.

The addition-processed output signal (pulse compression signal described subsequently) is outputted to the threshold value processing unit 11*d*. The threshold value processing unit 11*d* compares the output signal with the threshold value that is preset in a threshold value setting portion 11*d'* and sends the timing signal to a signal existence judgment portion 12*b* if the output signal exceeds the threshold value.

On the other hand, the confirmation signal received by the receiver 11*a* is also sent to a signal level detection circuit 12*a* and a signal indicating the signal level detected by the detection circuit 12*a* is sent to the signal existence judgment portion 12*b*. The confirmation signal from the FSK demodulation circuit 11*b* and identification code signal from the identification code memory 13*b* are also inputted in addition to the above signal to the signal existence judgment portion 12*b*.

The signal existence judgment portion 12*b* judges whether there is a match between the confirmation signal and identification signal and judges whether the signal level of the confirmation signal received within a fixed time t after receiving the timing signal from the threshold value processing unit 11*d* is equal to or more than a fixed value. The signal existence judgment portion 12*b* does not emit an output signal unless these two judgments are both established and outputs a warning signal when the matching judgment is established and it is judged that the signal level is equal to or less than a fixed value. The warning signal is supplied to the cellular phone 30 by the connection portion of the authentication card 1 and cellular phone 30 and the cellular phone 30 issues a warning as a result of receiving a warning signal. This warning is issued by means of a warning sound of a speaker or by displaying a warning on a display apparatus, for example.

Figure 3:
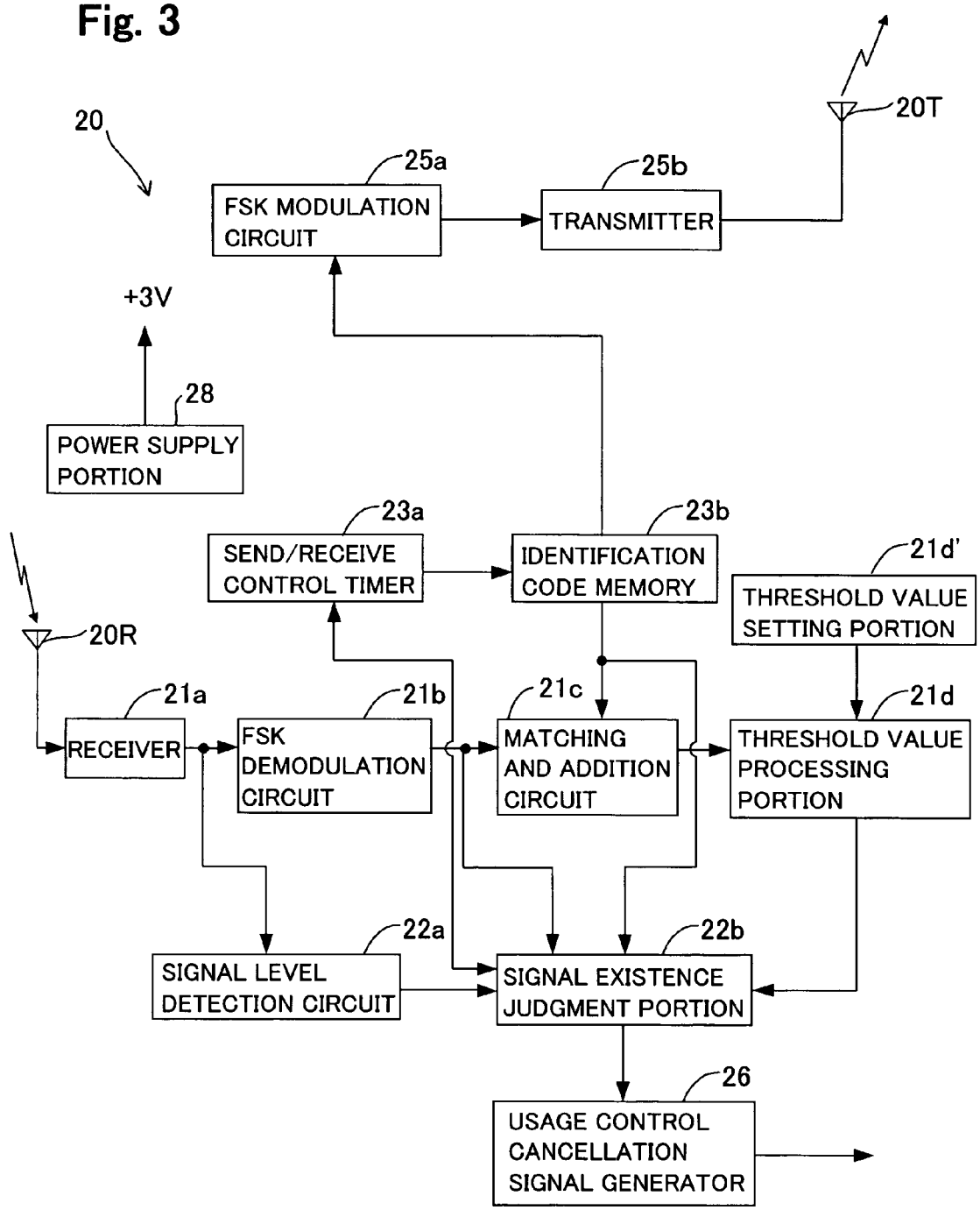
FIG. 3 is a block diagram showing a constitutional example of a cancellation unit 20.

FIG. 3 is a block diagram showing a constitutional example of the cancellation unit 20. The cancellation unit 20 operates when power from the power supply unit (battery pack and power supply regulator) 28 (or a power supply unit when the memory card 200 comprises a power supply unit) of the PDA40 is supplied as a result of the authentication card 2 being inserted in the PDA40.

The cancellation unit 20 is, in specific terms, largely the same as the transmission unit 10 in FIG. 2 but slightly different in part. The focus of the following description will be on the parts that are different.

A signal existence judgment portion 22*b* judges the existence of the signal based on the identification signal sent by the transmission unit 10 and does not output any signal unless the identification code is received. This is the same as for the transmission unit 10. On the other hand, a usage restriction cancellation signal generator 26 always produces a usage restriction cancellation signal in the absence of the output signal of the signal existence judgment portion 22*b* and terminates transmission of the cancellation signal from the signal generator 26 in accordance with the output signal from the signal existence judgment portion 22*b* when an identification signal is not received.

Further, the power of the power supply portion 28 is always sent to the respective constituent parts without receiving the control of the send/receive control timer 23*a*. This is because, as will be described subsequently, regardless of when the transmission unit 10 transmits the identification signal, the cancellation unit 20 can always receive the identification signal and, after judging the existence of the identification signal on the basis of the signal, it is always possible to send back the confirmation signal from the transmission system at predetermined intervals by means of an instruction of the send/receive control timer.

The other constituent elements are basically the same as those of the transmission unit 10 in FIG. 2 and the same constituent elements are numbered in the twenties, with the same last digit. A description of these elements is therefore omitted here.

Figure 6:
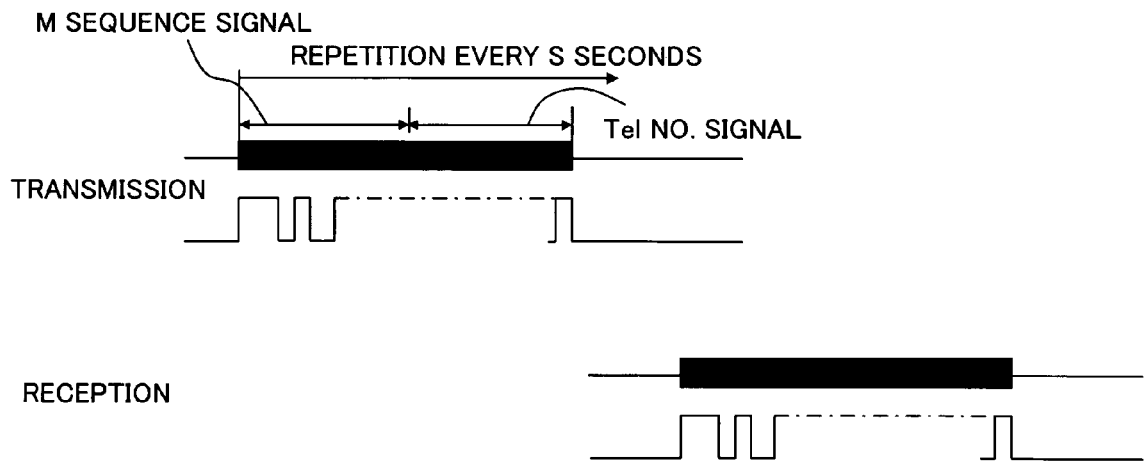
FIG. 6 is an explanatory view of the constitutional content of an identification number.

In the description of the respective constituent elements, the identification signal from the transmission unit 10 is a signal containing a unique preset code signal. However, as shown in FIG. 6, the identification signal constitutes an M sequence (Maximum length null sequence) signal (M sequence data) and a unique code signal of the telephone number of the next cellular phone 30 (known simply as 'telephone number' hereinafter). As will be described subsequently, the inclusion of the M sequence signal in the segment excluding the telephone number as the identification number serves to render a signal that is favorable during specific circuit processing for identifying, when the identification number is received, whether the received signal is a signal of its own cellular phone.

Further, the identification number is transmitted as an intermittent signal the units of which are an M sequence signal and telephone number signal that are repeated every optional time interval of S seconds (one or two seconds, for example). This serves the conservation of electricity and permits long-term transmission by preventing and stabilizing consumption of the battery. The M sequence signal may be a C/A code, P code, or linear FM number or the like. Further, a telephone number constituting a unique code signal may be a signal indicating another ID number for a device other than a cellular phone or information on another owner or manager.

The M sequence signal is one type of binary pseudo-random signal and is a code comprising 1's and 0's of a length rendered by subtracting 1 from 2 to the power n, that is, of length $(2^n-1)$, i.e. a signal of 31 bits if n=5, for example. When the M sequence signal is sent to the matching and addition circuit 11c, a pulse compression signal indicated by code B in FIG. 7 is obtained. In this pulse compression, $\frac{1}{31}$ signal compression is performed on the M sequence signal, which is an input signal.

Furthermore, although equivalent sales of the cellular phone are required, assuming a code length of a length of m bits, $2^m$ types are possible, and assuming m=30, for example, the unique code signal permits unique code signals of approximately one thousand million types. In this embodiment, the unique code signal is a telephone number but it is understood that the unique code signal could also be another ID number. If the M sequence signal and unique code signal are pre-stored in an identification code memory as an identification code, it is possible to effectively prevent unauthorized usage when the cellular phone is mislaid or stolen and so forth.

Figure 4:
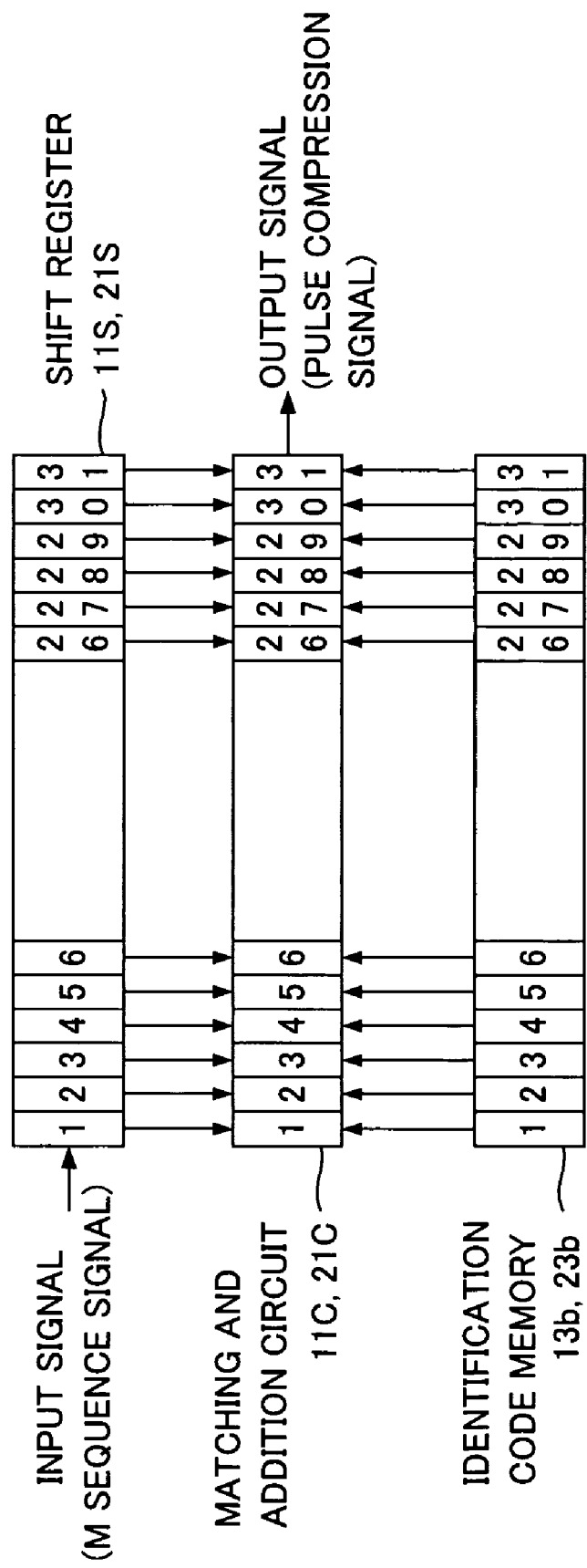
FIG. 4 is a detailed constitutional example of a matching and addition circuit.

FIG. 4 shows the details of a constitution in which an identification signal is transmitted by the transmission unit 10 and, after the identification signal is received by the cancellation unit 20, the same signal is sent back as a confirmation signal after a fixed time interval by the cancellation unit 20 on the basis of the identification signal and the signal received by the transmission unit 10 is subjected to pulse compression processing by the matching and addition circuit 11c of the transmission unit 10.

When the FSK demodulation circuit 11b demodulates the confirmation signal, the leading M sequence signal of the confirmation signal is temporarily stored in a shift register 11s that is not illustrated in FIG. 3.

The M sequence signal that is written to the shift register 11s is sent to the matching and addition circuit 11c. The matching and addition circuit 11c reads an M sequence signal from among storage data that is pre-stored in the identification code memory 13b, compares whether the two M sequence signals match each bit and add the number of matching bits.

The signal that has undergone matching and addition processing is outputted by the matching and addition circuit 11c as a pulse compression signal. Further, in this example, while the shift register 11s has a storage capacity of 31 bits, the identification code memory 13b stores both an M system signal (31 bits) and a unique code signal (29 bits) and therefore has a storage capacity of 60 bits. Therefore, when the two M sequence signals are processed, 31 bits constituting a data part of the M sequence signal among 60 bits of the identification code memory 13b are called.

The action of the transmission unit 10 and the action of the cancellation unit 20 will be described below. First, when the authentication card 1 is inserted in the cellular phone 30, the power of the power supply unit of the cellular phone 30 is supplied and the send/receive control timer 13a is immediately set. Further, the power supply control circuit 14 closes the switch 18a by means of a signal from the send/receive control timer 13a. As a result, power is supplied from the power supply unit 18 to each part.

Figure 5:
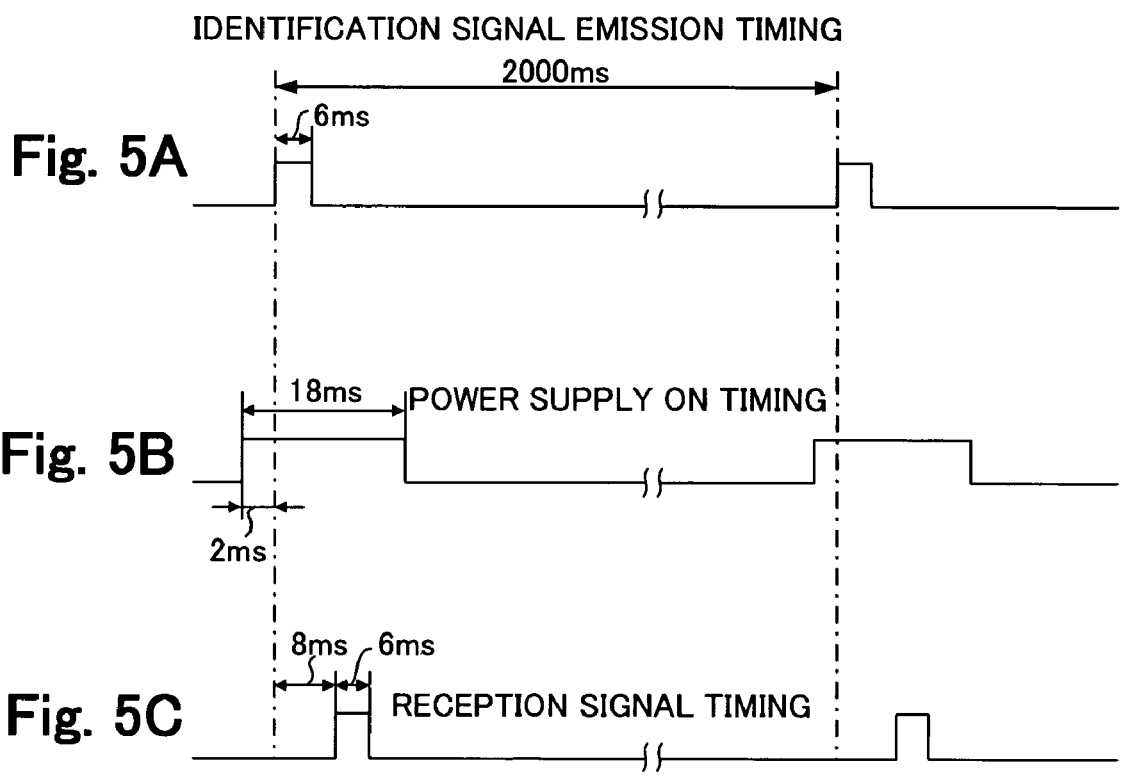
FIG. 5 is an explanatory view of an identification code and transmission timing.

As shown in the time charts of FIGS. 5A and 5B, when 2 ms have elapsed after the power supply turns ON, the identification signal is read from the identification code memory 13b and converted by the FSK modulation circuit 15a in accordance with an instruction of the control timer 13a, before being transmitted by the transmitter 15b via the transmission antenna 10T.

As described earlier, the transmission of the identification signal is performed by performing FSK modulation on a 31-bit M sequence signal and a subsequent 29-bit unique code signal indicating a specific telephone number.

When the transmission signal of the identification signal from the transmission unit 10 is equal to or more than a predetermined level and received by the cancellation unit 20, and the identification symbol is confirmed as its own, a transmission signal that is the same as the identification signal is sent back by the cancellation unit 20 and received by the transmission unit 10 as a confirmation signal.

The timing of the transmission and reception is as shown in FIGS. 5A to 5C and the power supply of the transmission unit 10 is ON for a total of activation (2 ms)+transmission(6 ms)+lag time (2 ms)+return (6 ms)+lag time (2 ms)=18 ms.

Thereafter, the transmission timing is controlled by the control timer 13a so that the power supply is ON for a fixed time that is 2000 ms, for example, from the initial power supply ON after a fixed time has elapsed. The fact that a warning signal is not sent to a warning circuit 16 and so forth on the basis of the reception signal and so forth because subsequent processing (described subsequently) is not performed even when the signal transmitted by the transmission unit 10 is received by the receiver 11a of the transmission unit 10 means that the signal does not act as the original reception signal and is classified as a confirmation signal.

On the other hand, when the confirmation signal that is sent back with predetermined timing by the cancellation unit 20 is received by the receiver 11a, the pulse compression processing by the matching and addition circuit 11c after demodulation by the FSK demodulation circuit 11b has already been described with reference to FIG. 4. In this pulse compression processing, the M sequence signal of symbol A shown in FIG. 7A in the confirmation signal is subjected to pulse compression processing and, as indicated by symbol B, for a signal that has undergone matching and addition processing, the value of the pulse compression signal constantly fluctuates so that the data of each bit partially conforms to the value of each corresponding bit of the M sequence signal storage data of the identification code memory at a midway point prior to or after completely writing the pulse train of the M sequence signal to the shift register 11s.

However, when data matching the M sequence signal stored in its own identification code memory 13b is written to the shift register 11s, if the bit count that has undergone matching and addition processing by the matching and addition circuit 11c is completely established for the total bit count 31 of the shift register 13s, the pulse compression signal is 31 and if the M sequence signals completely match or at least the matched and added bit count is 24 or more, the two M sequence signals can be considered to match.

Therefore, the threshold value processing unit 11d judges whether the pulse compression processing signal is equal to or more than the threshold value, 24, for example, that is preset by the threshold value setting portion 11d' (see FIG. 7B) and when it is judged that the threshold value is exceeded, a timing signal as shown in FIG. 7C is outputted to the signal existence judgment portion 12b.

Figure 8A:
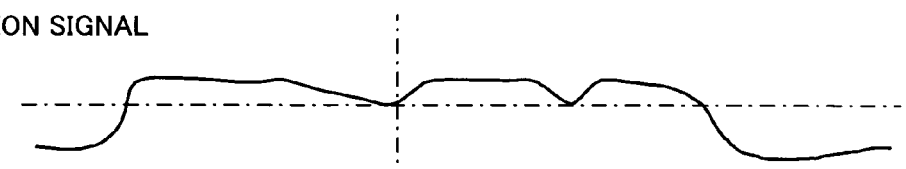
FIG. 8 is an explanatory view of the relationship between the wave detection waveform of the reception signal and a confirmation signal.
Figure 8B:
Figure 8C:
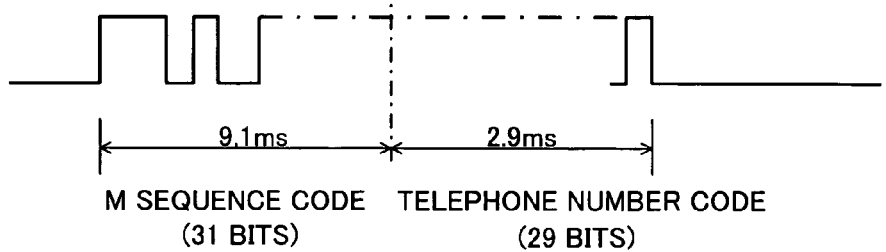

Further, as mentioned earlier, the signal level of the reception signal received by the receiver 11a is detected by the signal level detection circuit 12a and it is judged by the signal existence judgment portion 12b whether the signal level is equal to or more than a fixed value. The judgment of the signal level provides the threshold value of a certain voltage relative to the reception signal of the wave detection waveform shown in FIG. 8A and if the signal level is a higher level, it is judged that a signal at or above a fixed level has been received.

Figure 9A:
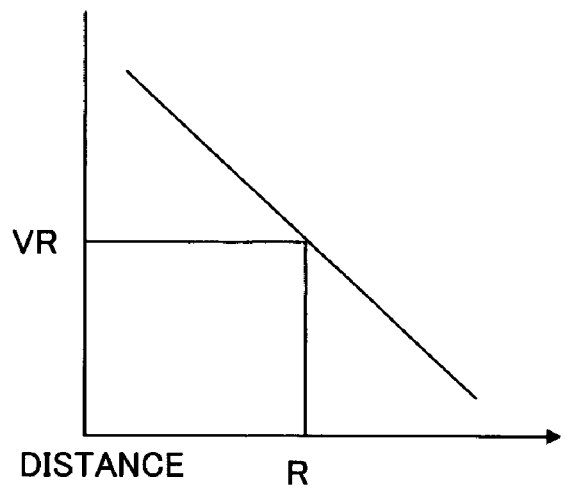
FIG. 9 is an explanatory view of a reception signal level and signal level judgment interval.
Figure 9B:
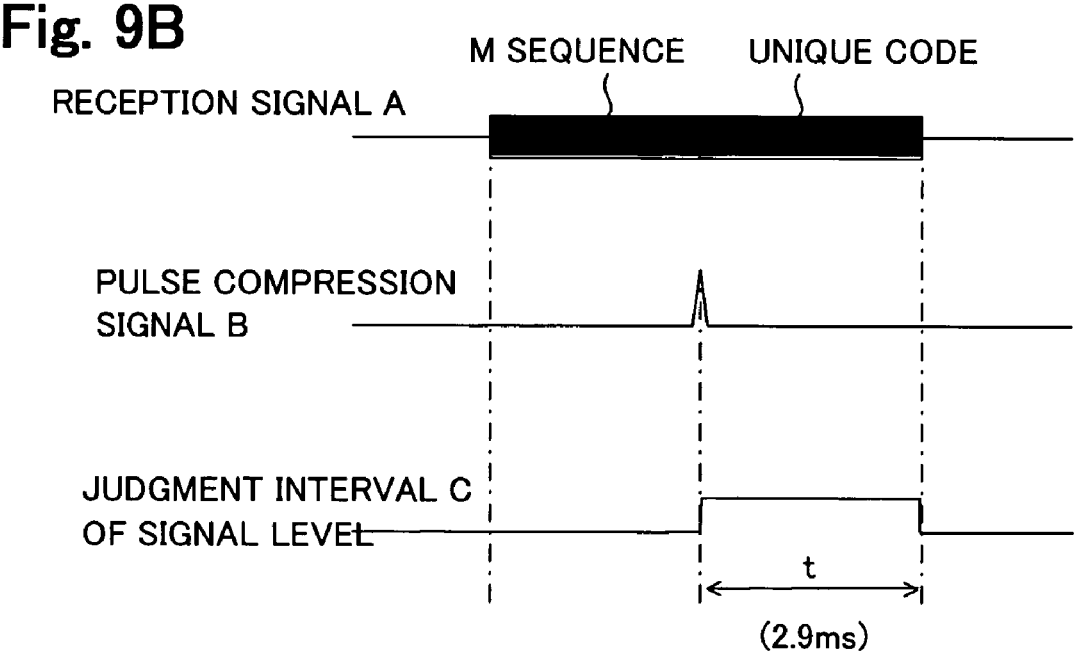

As shown in FIG. 9A, the judgment is based on the fact that, when the distance R between the transmission unit 10 and cancellation unit 20 is large when a signal transmitted at a fixed intensity is received, the reception signal level drops as an inverse proportion of a multiple of two of the distance. One judgment method establishes the threshold value in correspondence with a predetermined distance (1 m, for example) and, if the received signal level is equal to or less than the threshold value, it can be detected that the transmission unit 10 and cancellation unit 20 are separated by the predetermined distance or more. Further, FIG. 9A shows this by way of a logarithmic scale.

Instead of the above judgment method, the level of the reception signal may be determined by measuring the voltage level of the reception signal by A/D converting the wave detection waveform of the reception signal.

The signal-level judgment is performed symmetrically only for a fixed time t (2.9 ms in the illustrated example) that corresponds to a unique code signal that is received after a threshold-value processed timing signal relative to the M sequence signal is received from the threshold value processing unit 11d. This is so that noise and signal levels from other telephones are not detected and it is possible to perform a judgment accurately by rendering the judgment interval a fixed time that is specified by a timing signal.

In addition to the judgment of the signal level, the judgment by the signal existence judgment portion 12b is also performed irrespective of whether the unique code signal that is received after the timing signal is inputted and has undergone FSK modulation matches the unique code signal stored in the identification code memory. Therefore, when there is an input of a timing signal, the signal existence judgment portion 12b receives a reception signal of a predetermined level a fixed time after the timing-signal input and, upon judging that the received unique code signal matches its own unique code signal, the cancellation unit 20 exists within a fixed distance from the transmission unit 10 and the signal existence judgment portion 12b does not output any signal.

However, even when there is a timing-signal input and the unique code signal matches the signal existence judgment portion 12b's own unique code signal, if the signal level is equal to or less than a fixed level, the cancellation unit 20 is a fixed distance or more away from the transmission unit 10 and, in this case, the signal existence judgment portion 12b outputs a warning signal to the cellular phone 30.

By supplying a warning by emitting a speech message such as 'Don't leave me', for example, over the speaker (not shown), the cellular phone 30 warns the owner that the PDA40 (cancellation unit 20) is no longer at hand as a result of being mislaid or stolen.

Further, in addition to a system in which a speech message is supplied, the warning may be any system as long as the system is one in which a warning such as a warning sound such as a 'beep' or that and a display such as 'Don't leave me' on a display apparatus is supplied by any means. Further, even when a signal other than a confirmation signal of the own identification code signal is received, because any or several of the three conditions are not established, the signal existence judgment portion 12b does not output the output signal and it is understood that there is no effect on the reception operation of the transmission unit 10.

The action of the cancellation unit 20 is as follows. As mentioned earlier, as a result of the cancellation unit 20 being inserted in the PDA40, power is always supplied to each of the constituent elements by the power supply portion 28 irrespective of whether the power supply switch of the cellular phone 30 is ON or OFF. Hence, the identification signal is received by the receiver 21a of the cancellation unit 20 at substantially the same time as the identification signal is transmitted by the transmission unit 10.

The fact that the received identification signal is demodulated by a FSK demodulation circuit 21b and sent to a matching and addition circuit 21c and the timing signal based on the M sequence signal is sent by a threshold value processing unit 21d to the signal existence judgment portion 22b is the same. In addition, the fact that the signal level of the received signal is detected by a signal level detection circuit 22a and it is judged whether the signal level is equal to or more than a fixed level within a fixed judgment time t in which the timing signal is sent to the signal existence judgment portion 22b is the same.

Furthermore, the fact that the signal existence judgment portion 22b judges whether the incoming signal matches its own unique code signal that is pre-stored in an identification code memory 23b is the same as in the case of the transmission unit 10. However, the signal existence judgment portion 22b of the cancellation unit 20 does not output any output signal when three conditions which are the timing signal, the signal level is equal to or more than a fixed level in two judgments and that the unique code signals match.

As long as the output signal is not present, the cancellation unit 20 and, therefore, the PDA40 is not separated from the transmission unit 10 and is in the owner's possession and the usage restriction cancellation signal is always outputted by the usage restriction cancellation signal generator 26. Hence, the cellular phone 30 is always in a usable state.

Further, when an identification signal is received and a fixed time (2 ms in this example) is exceeded in the signal-existence judgment processing by the signal existence judgment portion 22b, the send/receive control timer 23a is set at this instant by a signal from the signal existence judgment portion 22b and the received identification signal and exactly the same signal are read by the identification code memory 23b and transmitted via the FSK modulation circuit 25a and transmitter 25b. As mentioned earlier, this signal is received by the transmission unit 10 as a confirmation signal.

However, when the cancellation unit 20 is moved a fixed distance or more away from the PDA40 and transmission unit 10 as a result of being mislaid or stolen by some chance, the signal level is equal to or less than a fixed level in the detection of the signal level and the signal existence judgment portion 22b judges that the identification signal has not been received. When this judgment is performed, the output signal is outputted by the signal existence judgment portion 22b and the output of the usage cancellation signal that is supplied to the PDA40 by the cancellation signal generator 26 is terminated. As a result, the PDA40 is in an unusable state.

As mentioned earlier, such unusable states include erasure of the internal memory of the PDA40 and turning the power supply OFF and so forth. For example, the erasure of the internal memory of the PDA40 is performed as a result of an interrupt signal being inputted to the CPU of the PDA40 as a result of termination of the usage cancellation signal (when the signal level is at the low level, for example) and a memory erasure program being executed by the CPU of the PDA 40 as a result of the interrupt signal. The memory erasure program is pre-stored in the memory card 200 of the authentication card 2 and may be downloaded from the memory card 200 to the PDA 40 when the authentication card 2 is inserted or may be pre-stored in the internal memory of the PDA 40.

Figure 10A:
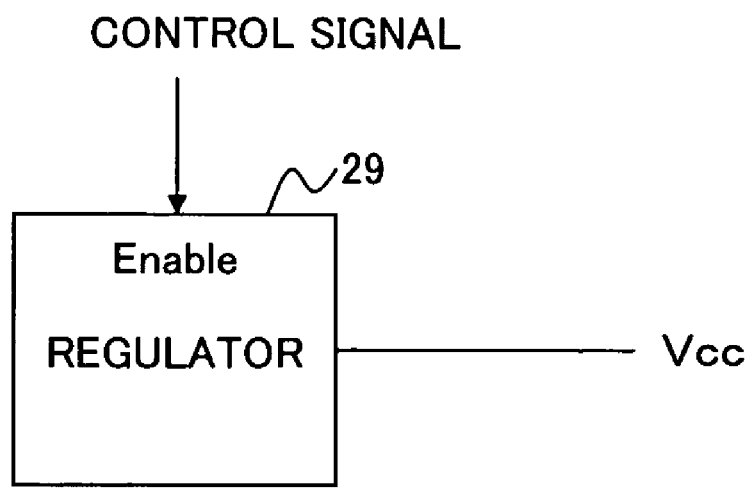
FIGS. 10A and 10B are block diagrams showing the constitution of a circuit that turns off the power supply of a device in which a usage restriction cancellation unit is provided.
Figure 10B:
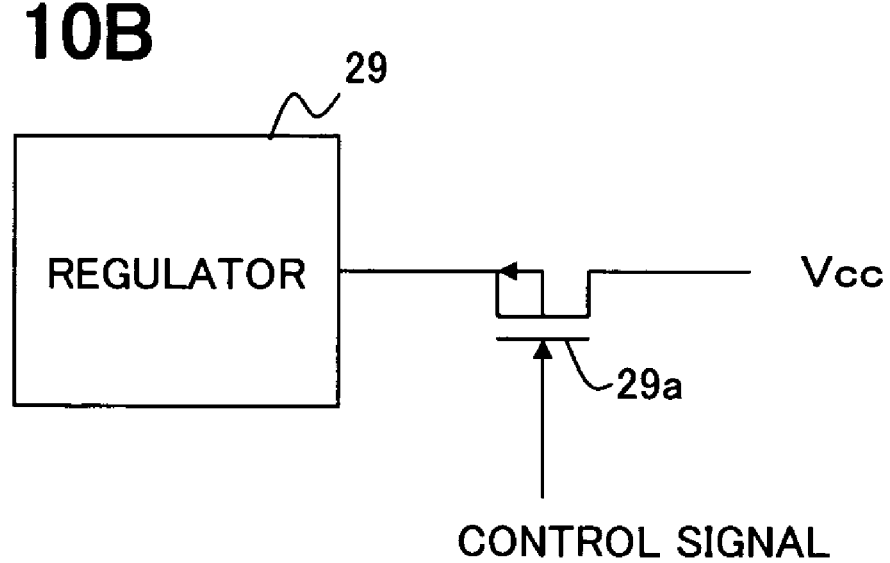

Furthermore, when the power supply of the PDA 40 is turned OFF, this can be performed controlling the regulator 29 of the PDA 40 as shown in FIG. 10A or 10B, for example. As shown in FIG. 10A, when an Enable terminal for controlling the enable/disable of the regulator 29 exists on the regulator 29 of the PDA 40, the PDA 40 sets the signal inputted to the Enable terminal at the low level (disabling level) as a result of termination of the usage cancellation signal. As a result, the power outputted from the regulator 29 is terminated and the PDA 40 is turned off. Alternatively, when the termination of the usage restriction cancellation signal operates to shift the usage restriction cancellation signal from the high level to the low level, the usage restriction cancellation signal can also be inputted as is to the regulator 29 directly as a control signal.

Further, as shown in FIG. 10B, when the regulator 29 does not comprise an Enable terminal for controlling the enable/disable, a MOS switch 29a is provided on the output side of $V_{cc}$ of the regulator 29, a control signal is inputted to the MOS switch 29a and the ON and OFF of the power supply can be controlled.

Further, a constitution that allows the owner to select PDA 40 memory erasure or a power supply off state as an unusable state is possible or memory erasure can be preset as the default selection.

As detailed above, in this embodiment, the authentication card 1 comprising the transmission unit 10 is inserted in the cellular phone 30, the owner or user puts the cellular phone 30 in their pocket or the like, the authentication card 2 comprising the cancellation unit 20 is inserted in the PDA 40 and the two authentication cards are used as one and, hence, when the PDA 40 is moved together with the cancellation unit 20 a fixed distance or more away from the transmission unit 10, it is possible to prevent unexpected illegal usage and an outflow of information and so forth by restricting usage of the PDA 40. Further, the owner or user is supplied with a speech warning or other warning via the cellular phone 30 and is thus able to immediately identify the fact that the PDA 40 is no longer in their possession.

In addition, as mentioned earlier, when the authentication card 1 is removed from the cellular phone 30, the cellular phone 30 establishes an unusable state for itself. Such unusable states include a state where the power supply of the cellular phone 30 is in an OFF state and cannot be turned ON and a state where an input cannot be received. Similarly, when the authentication card 2 is removed from the PDA 40, the PDA 40 establishes an unusable state for itself. Such unusable states include, for example, a state where the content of the memory of the PDA 40, a state where the power supply of the PDA 40 is in an OFF state and cannot be turned ON and a state where an input cannot be received, and so forth.

For example, a terminal that assumes a high level when the authentication card is inserted in a connector terminal that connects the authentication card with the cellular phone 30 or PDA 40, and which assumes a low level (ground level) as a result of removal is provided and, as a result of the terminal assuming the low level, the memory erasure program is activated or the power supply can enter an OFF state and so forth. In a case where the power supply is in the OFF state, as illustrated in FIG. 10A or 10B, this can be achieved by means of a regulator enable terminal or MOS switch.

Further, although the target device for the usage restrictions was described with the PDA 40 as the example in the above embodiment, target devices also include all kind of devices such as word processors, personal computers, various game machines, automobiles and vaults. Further, although a case where radio waves are used as the signal transmission medium was described, ultrasonic waves or light or the like may otherwise be used.

Second Embodiment

Figure 11:
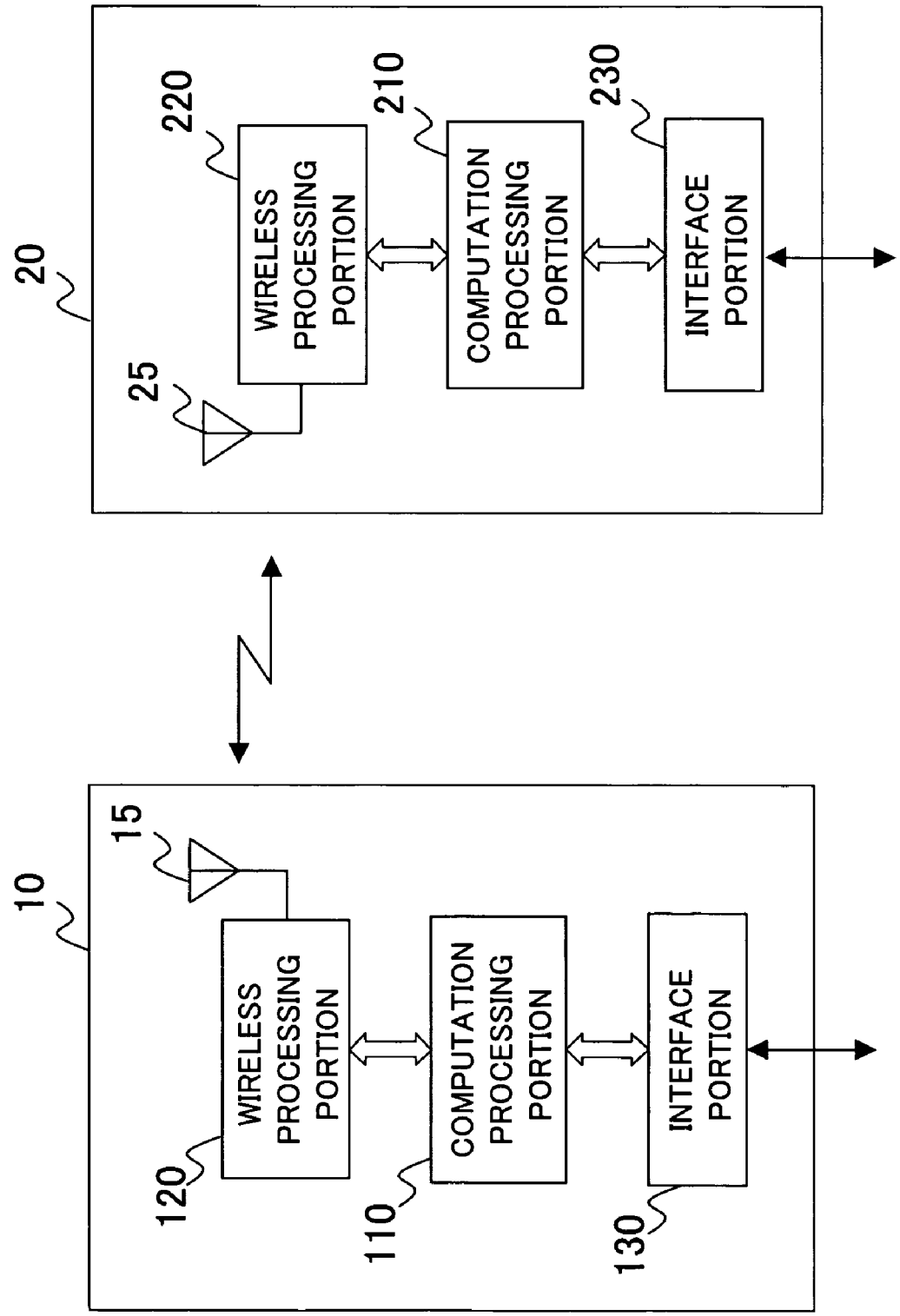
FIG. 11 is a block diagram showing a schematic constitution of an authentication-card transmission unit and authentication-card cancellation unit according to a second embodiment of the present invention.

FIG. 11 is a block diagram showing a schematic constitution of the transmission unit 10 of the authentication card 1 and the cancellation unit 20 of the authentication card 2 according to the second embodiment of the present invention.

The transmission unit 10 comprises a computation processing unit 110, a wireless processing unit 120, and an interface 130. A wireless communication antenna 15 is attached to the wireless processing unit 120. The cancellation unit 20 has the same constitution as the transmission unit 10 and comprises a computation processing unit 210, a wireless processing unit 220, and an interface 230. A wireless communication antenna 25 is attached to the wireless processing unit 220.

The interface 130 constitutes a connection portion (connector or the like, for example) with the cellular phone 30 and may also serve as the connection portion with the cellular phone 30 of the memory card 100. For example, when the memory card 100 is an SD memory card (registered trademark), a serial interface (RS232C or the like) with the cellular phone 30 may also serve as the interface 130. The same is also true of the interface 230.

Figure 12:
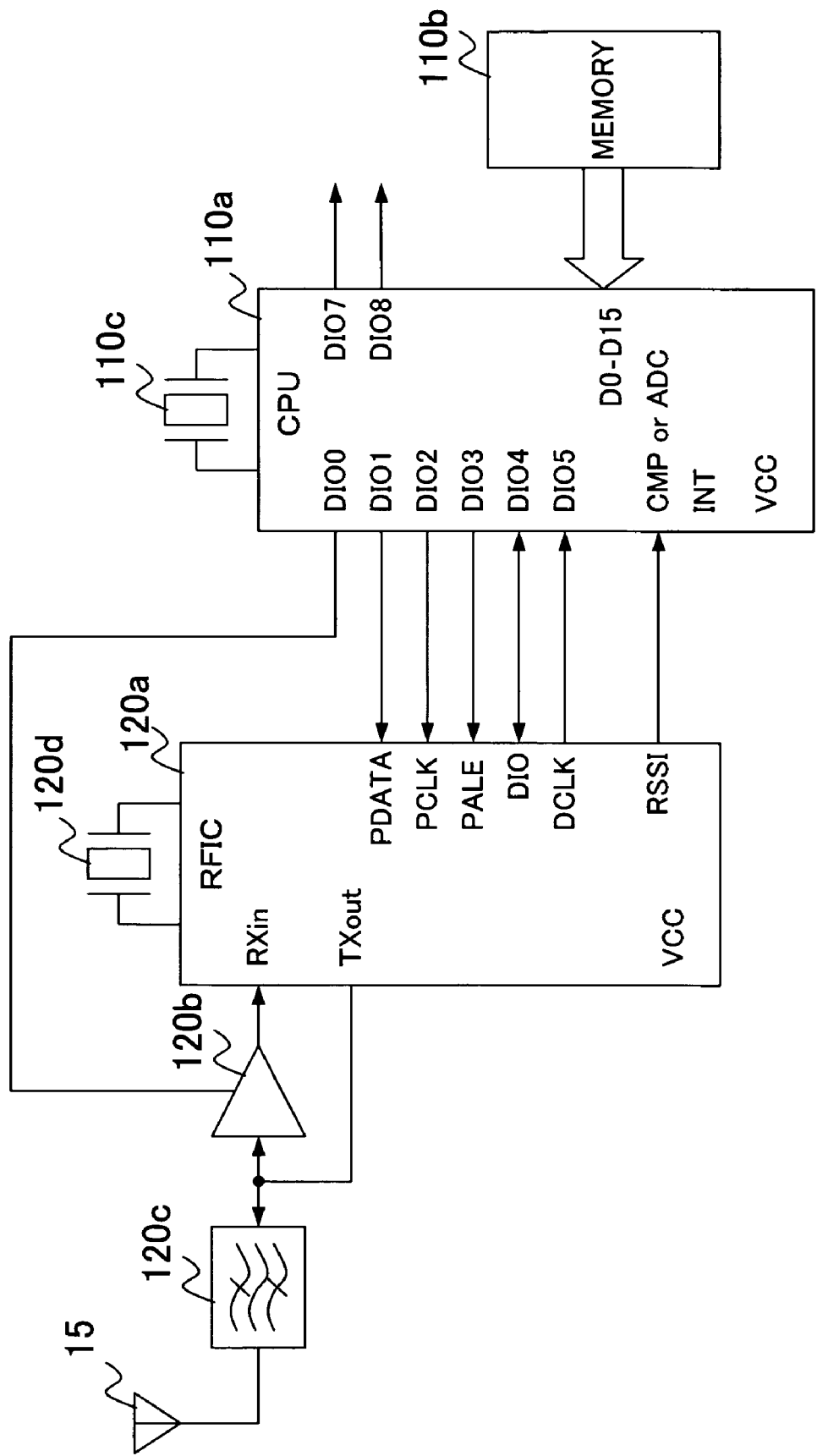
FIG. 12 is a block diagram showing a specific constitutional example of a computation processing unit and wireless processing unit.

FIG. 12 is a block diagram showing a specific constitutional example of the computation processing unit 110 and the wireless processing unit 120. In this constitutional example, the computation processing unit 110 corresponds to a CPU (microprocessor) 110a and memory 110b and the wireless processing unit 120 corresponds to an RFIC 120a constituted by an IC chip, for example, a pre-amplifier 120b and a band filter 120c. Further, part of the memory (flash memory, for example) of the memory card 100 may be used for the memory 110b or the memory 110b may be provided separately as the dedicated memory (EEPROM or the like, for example) of the computation processing unit 110 (microprocessor 110a).

When a card with a built-in controller (an SD memory card (registered trademark) or the like, for example) is used as the memory card 100, the built-in controller can be integrated with the computation processing unit 110 or the computation processing unit 110 can also be provided separately from the controller.

Figure 13:
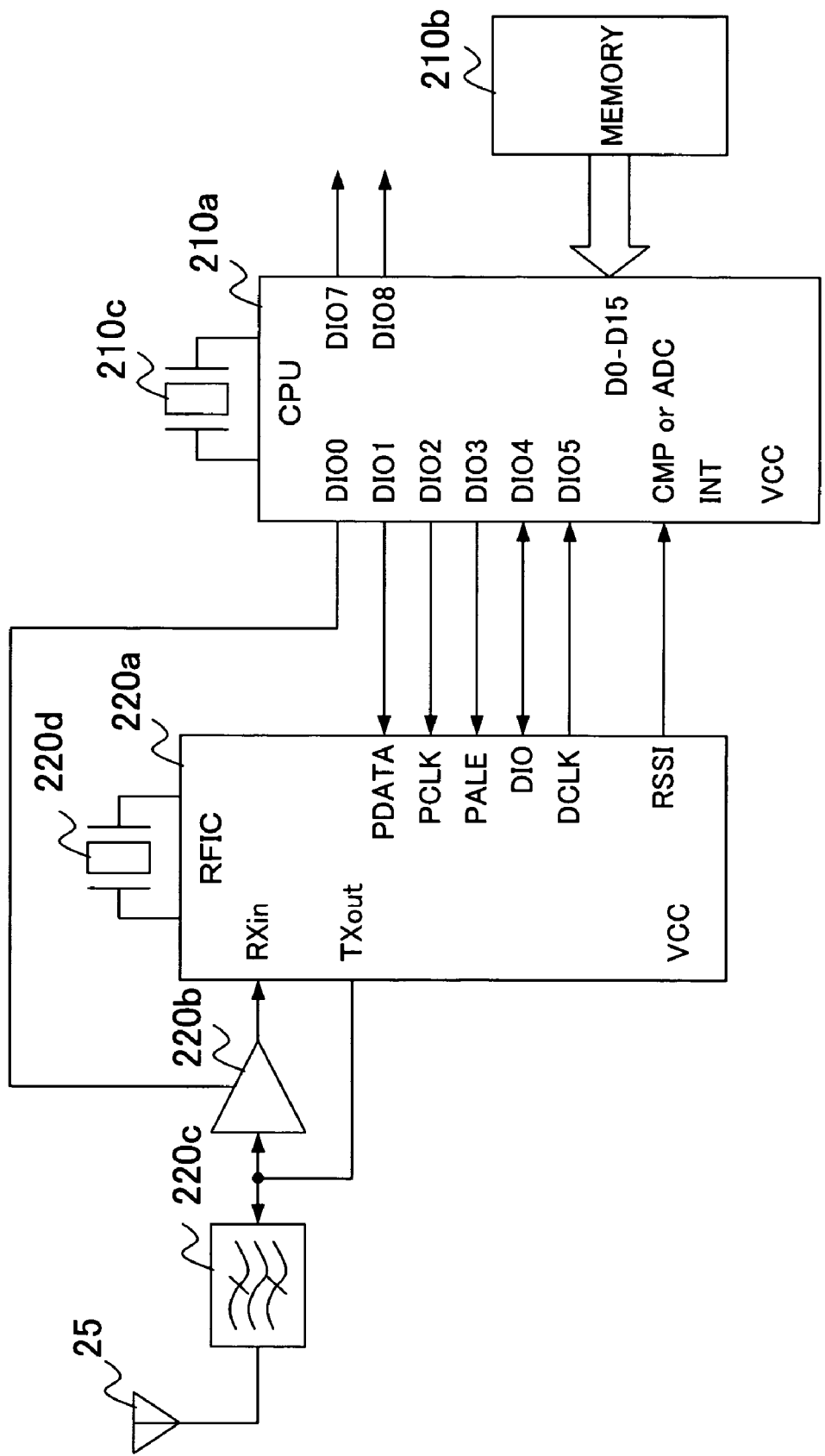
FIG. 13 is a block diagram showing a specific constitutional example of a computation processing unit and wireless processing unit.

FIG. 13 is a block diagram showing a specific constitutional example of the computation processing unit 210 and the wireless processing unit 220. So too in this the computation processing unit 210 similarly corresponds to a CPU (microprocessor) 210a and memory 210b and the wireless processing unit 220 corresponds to an RFIC 220a, pre-amplifier 220b, and a band filter 220c. Further, part of the memory card 200 may be used as the memory 210b or the memory 210b may be provided separately as a dedicated memory (EEPROM) of the computation processing unit 210 (microprocessor 210a).

Further, in order to supply an operation clock signal, a crystal oscillator 110c is installed in the microprocessor 110a and a crystal oscillator 210c is installed in the microprocessor 210a, and a crystal oscillator 120d is installed in the RFIC120a and a crystal oscillator 220d is installed in the RFIC220a.

As a result of the authentication card 1 being inserted in the cellular phone 30, power is supplied from a power supply apparatus (battery pack and power supply regulator) (not illustrated) of the cellular phone 30 to the computation processing unit 110 (terminal $V_{cc}$ of the microprocessor 110a) and wireless processing unit 120 (terminal $V_{cc}$ of the RFIC 120a) and so forth. Similarly, as a result of the authentication card 2 being inserted in the PDA40, power is supplied from a power supply apparatus (battery pack and power supply regulator) (not illustrated) (not illustrated) of the PDA40 to the computation processing unit 210 (terminal $V_{cc}$ of the microprocessor 210a) and wireless processing unit 220 (terminal $V_{cc}$ of the RFIC 220a) and so forth.

This power may be supplied by the power supply apparatus when a power supply apparatus (button cell or the like and power supply regulator, for example) is provided to the memory cards 100 and 200.

The memory 110b pre-stores a program that is executed by the computation processing unit 110 (microprocessor 110a), M sequence data (M sequence signal), the identification code of the authentication card 1, and the identification code of the authentication card 2 and so forth.

The computation processing unit 110 (microprocessor 110a) executes the program and executes authentication processing for the child authentication card 2. The program and data and so forth stored in the memory 110b is read as 16-bit data, for example, and inputted via the terminals D0 to D15 of the microprocessor 110a.

The wireless processing unit 120 (RFIC 120a) FSK-modulates M sequence data and an identification code and so forth that are supplied by the computation processing unit 110 and outputs a modulated signal. The converted signal is outputted via a terminal $Tx_{out}$ of the RFIC120a and transmitted by means of a wireless signal (RF signal) from the antenna 15 via the band filter 120c.

Further, the wireless processing unit 120 (RFIC 120a) inputs the M sequence data and identification code and so forth, which are received as a wireless signal from antenna 15, from a terminal $RX_{in}$ via the band filter 120c and pre-amplifier 120b. The wireless processing unit 120 (RFIC 120a) FSK-demodulates the received signal and sends the demodulated signal to the computation processing unit 110 (microprocessor 110a) as digital data.

The M sequence data and data of the identification code and so forth are sent and received between terminal DIO4 of the microprocessor 110a and terminal DIO of the RFIC120a, for example.

Program data (data prescribing control parameters) are supplied from terminal DIO1 of the computation processing unit 110 (microprocessor 110a) to the terminal PDATA of the wireless processing unit 120 (RFIC 120a). The program data are data for the transmission frequency, transmission signal level (transmission power), reception sensitivity, modulation frequency, and bit rate and so forth of the wireless processing unit 120 (RFIC120a), for example. The program data are supplied from the computation processing unit 11 (microprocessor 110a) during boot processing of the identification transmission unit 1 to the wireless processing unit 120 (RFIC 120a) and are set in the wireless processing unit 120 (RFIC 120a).

A clock signal is inputted from terminal DIO2 of the computation processing unit 110 (microprocessor 110a) to a terminal PCLK of the wireless processing unit 120 (RFIC 120a).

A latch enable signal is inputted by terminal DIO3 of the computation processing unit 110 (microprocessor 110a) to a terminal PALE of the wireless processing unit 120 (RFIC 120a). This latch enable signal is used when designating an address for writing wireless-control parameters of the computation processing unit 110 (microprocessor 110a).

A signal representing the level (reception level) of the reception signal is supplied from terminal RSSI of the wireless processing unit 120 (RFIC120a) to terminal CMP or ADC (terminal CMP is a terminal to which a signal of a target for performing a signal-level comparison is inputted and terminal ADC is a terminal to which an analog signal that is to be A/D converted is inputted, the description being represented by terminal CMP (abbreviated to 'CMP' below) hereinbelow) of the computation processing unit 110 (microprocessor 110a). The reception level indicates the strength (that is, signal power) of the signal received from the cancellation unit 20 by the wireless processing unit 120 (RFIC120a) and is detected by the wireless processing unit 120 (RFIC120a).

Memory 210b of the authentication card 2 pre-stores a program that is executed by the computation processing unit 210 (microprocessor 210a), M sequence data, identification code of the authentication card 2, and the identification code and so forth of the authentication card 1.

The computation processing unit 210 (microprocessor 210a) executes the program that is stored in the memory 210b and executes authentication processing for the authentication card 1. This program and data and so forth is read as 16-bit data, for example, and inputted from terminals D0 to D15 of the computation processing unit 210 (microprocessor 210a).

Data that is communicated between the computation processing unit 210 (microprocessor 210a) and wireless processing unit 220 (RFIC220a) is the same as data that is communicated between the computation processing unit 110 (microprocessor 110a) of the authentication card 1 and the wireless processing unit 120 (RFIC 120a) and will not be described here.

The mutual authentication processing that is performed between the authentication card 1 and authentication card 2 will be described next.

In the mutual authentication processing of this embodiment, unlike the first embodiment, the transmission unit 10 first transmits the M sequence signal to the cancellation unit 20 as a call signal to the cancellation unit 20 and, by way of response, the cancellation unit 20 transmits the M sequence signal and identification code and, in response, an authentication form in which the transmission unit 10 transmits an identification signal will be described.

Figure 14:
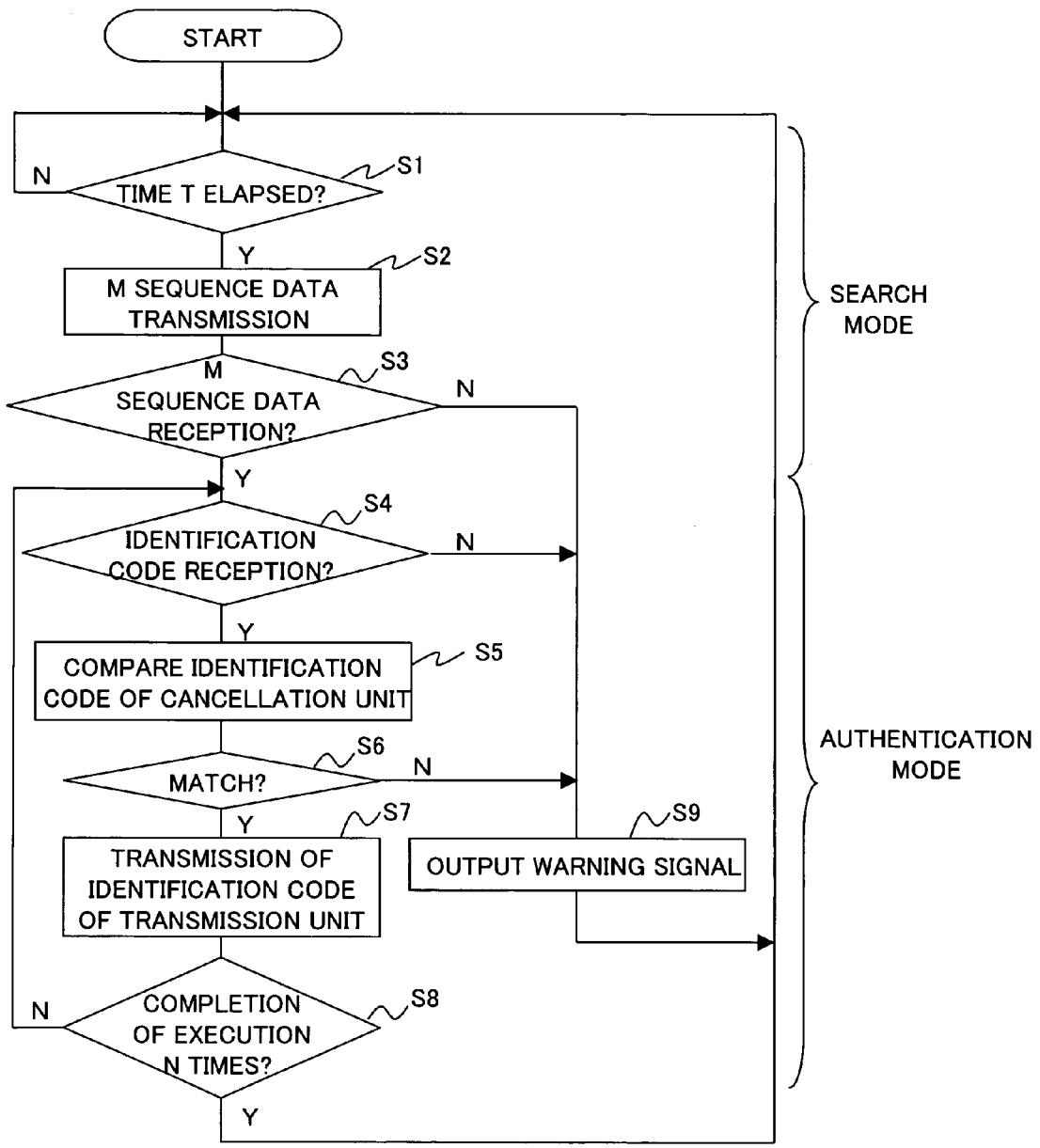
FIG. 14 is a flowchart showing the flow of processing of the transmission unit.
Figure 15:
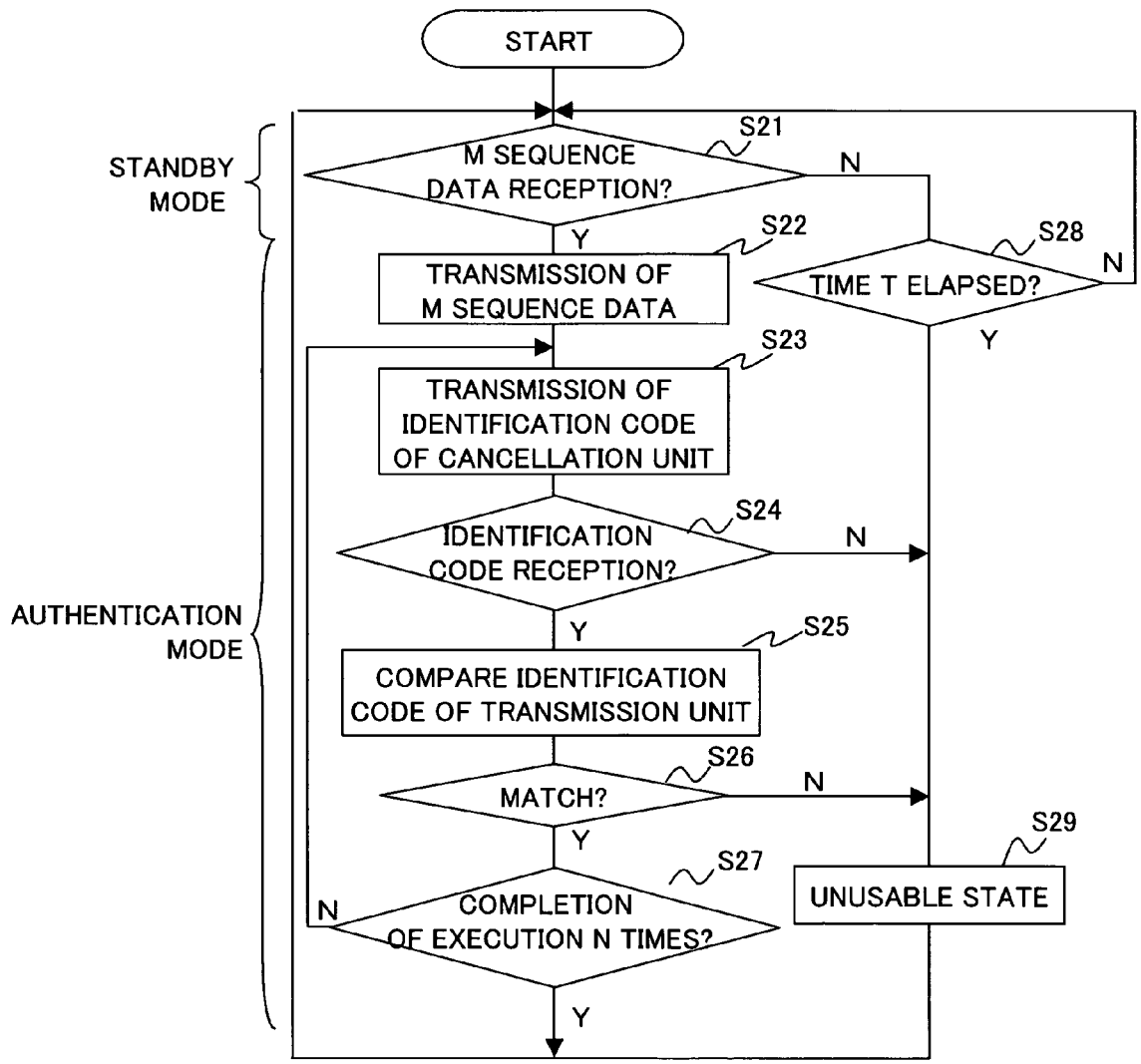
FIG. 15 is a flowchart showing the flow of processing of the cancellation unit.
Figure 16:
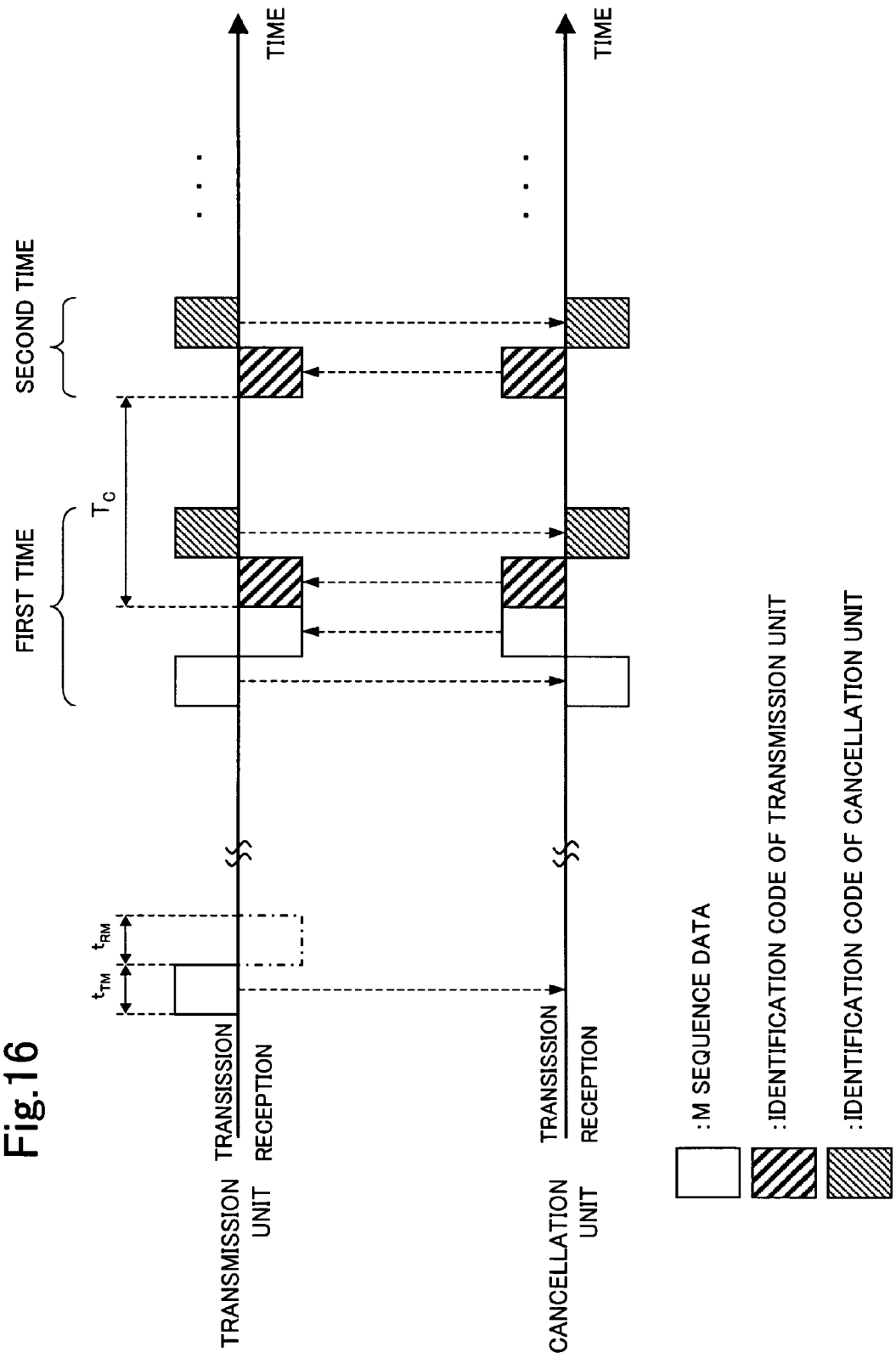
FIG. 16 is a time chart showing data that is communicated between the transmission unit and cancellation unit, and the communication timing.

FIG. 14 is a flowchart showing the flow of processing of the transmission unit 10. FIG. 15 is as flowchart showing the flow of processing of the cancellation unit 20. FIG. 16 is a time chart showing the data communicated between the transmission unit 10 and cancellation unit 20 and the communication timing.

Upon receiving a power supply as a result of being inserted in the cellular phone 30, the computation processing unit 110 (microprocessor 110a) of the transmission unit 10 shifts to a search mode at a predetermined time interval S (one second interval or two second interval, for example) (Y in S1) and immediately supplies M sequence data stored in the memory 110b from terminal DIO4 of the computation processing unit 110 (microprocessor 110a) to terminal DIO of the wireless processing unit 120 (RFIC 120a).

The wireless processing unit 120 (RFIC 120a) FSK-modulates an M sequence signal that is supplied by a computation processing unit 110 (microprocessor 110a) and transmits the FSK-modulated M sequence signal from the antenna 15 by means of a wireless signal of a predetermined level (transmission power) (S2). The transmission time $t_{TM}$ of the M sequence signal is several milliseconds, for example.

Following transmission of the M sequence signal, the transmission unit 10 enters a reception standby state in which same awaits M sequence data that is transmitted by the cancellation unit 20 in a predetermined standby time $t_{RM}$ (S3) The standby time $t_{RM}$ is set at the same value as the transmission time $t_{TM}$ of the M sequence data that is transmitted by the cancellation unit 20 and is several milliseconds. When the signal is not received in the standby time $t_{RM}$ (N in S3), the computation processing unit 110 (microprocessor 110*a*) issues a warning signal (S9) to the cellular phone 30 (S9). The warning signal is outputted by terminal DIO7 or DIO8, for example, and supplied to the processing unit (CPU or similar) of the cellular phone 30 via the interface 130. As a result, the cellular phone 30 outputs a warning sound from the speaker or displays a warning notice on a display apparatus to warn the owner.

On the other hand, the computation processing unit 210 (microprocessor 210*a*) and the wireless processing unit 220 (RFIC 220*a*) of the cancellation unit 20 usually enters a standby state (standby mode) of awaiting the M sequence data as a result of receiving a supply of power from the PDA40 (S21). Further, when the wireless processing unit 220 (RFIC 220*a*) receives the M sequence data, the wireless processing unit 220 (RFIC220*a*) supplies the received M sequence data from terminal DIO to the computation processing unit 210 (microprocessor 210*a*) via terminal DIO4 of the computation processing unit 210 (microprocessor 210*a*) and supplies the reception level of the M sequence data from terminal RSSI to the computation processing unit 210 (microprocessor 210*a*) via terminal CMP of the computation processing unit 210 (microprocessor 210*a*).

The computation processing unit 210 (microprocessor 210*a*) compares M sequence data that is inputted from terminal DIO4 and the M sequence data stored in memory 210*b* and judges whether the number of matching bits of the two M sequence data is equal to or more than a predetermined threshold value (predetermined reception level). The predetermined threshold value (predetermined reception level) is set at 24 in a case where the M sequence data is 31 bits, for example.

Further, the computation processing unit 210 (microprocessor 210*a*) compares the value of the reception level inputted by terminal CMP with a predetermined threshold value (predetermined reception level). The predetermined threshold value (predetermined reception level) is set at the value of the reception level that corresponds with a predetermined distance (a new meters, for example) between the transmission unit 10 and cancellation unit 20. The relationship between the reception level and distance is found from the fact that the reception level is inversely proportional to the distance to the power of two, as described in the first embodiment.

The computation processing unit 210 (microprocessor 210*a*) judges that the M sequence data has been received when the matching bit count of the two M sequence data is equal to or more than a threshold value (a predetermined reception level) and the reception level is equal to or more than the threshold value (a predetermined reception level) (Y in S21) and shifts from standby mode to authentication mode.

Further, the computation processing unit 210 (microprocessor 210*a*) transmits the M sequence data (that is, the M sequence data of the cancellation unit 20) stored in the memory 210*b* by means of a wireless signal via the wireless processing unit 220 (RFIC220*a*) (S22) and, following on from the transmission of the M sequence data, transmits the identification code (stored in memory 210*b*) of the cancellation unit 20 by means of a wireless signal via the wireless processing unit 220 (RFIC220*a*) (S23).

On the other hand, the computation processing unit 210 (microprocessor 210*a*) judges that the M sequence data has not been received when the matching bit count of the two M sequence data is less than the threshold value (predetermined reception level) or the reception level is less than the threshold value (predetermined reception level) (N in S21).

When M sequence data has not been received, the computation processing unit 210 (microprocessor 210*a*) judges whether the abovementioned time S has elapsed by means of a built-in timer (not illustrated) or the like (S28) and, when time S has not elapsed, the computation processing unit 210 (microprocessor 210*a*) continues the standby mode and enters an M sequence data reception standby state (S21). On the other hand, when the M sequence data is not received in time S (Y in S28), the computation processing unit 210 (microprocessor 210*a*) outputs a signal from terminal DIO7 or DIO8 to the PDA40 via the interface 230 (the level of the signal is shifted from the low level to the high level or from the high level to the low level) and affords the PDA40 an unusable state (S29).

As per the first embodiment, such unusable states include states where the content of the memory of the PDA40 is erased, the power supply is in an OFF state and an input cannot be received. For example, when the content of the memory is erased, as described in the first embodiment, a memory erasure program stored in the memory card 200 of the authentication card 20 is inserted and downloaded to the PDA40, the signal of terminal DIO7 or DIO8 is supplied as an interrupt signal to the CPU of the PDA40 and the memory content is erased as a result of the CPU executing the memory erasure program in accordance with this interrupt signal.

Further, methods for turning OFF the PDA40 include the method shown in FIGS. 10A and 10B as per the first embodiment. In this case, for example, the signal of terminal DIO7 or DIO8, for example, is supplied as a control signal and the power supplied to the PDA40 can be turned OFF by setting the control signal at the low level.

Upon receiving the M sequence data from the cancellation unit 20 in the standby time $t_{RM}$ after the transmission of the M sequence data in step S2, the wireless processing unit 120 (RFIC120*a*) of the transmission unit 10 supplies the received M sequence data from the terminal DIO to the computation processing unit 110 (microprocessor 110*a*) via terminal DIO4 of the computation processing unit 110 (microprocessor 110*a*). Further, the wireless processing unit 120 (RFIC120*a*) supplies the reception level of the M sequence data from terminal RSSI to the computation processing unit 210 (microprocessor 210*a*) via terminal CMP of the computation processing unit 110 (microprocessor 110*a*).

The computation processing unit 110 (microprocessor 110*a*) compares the M sequence data inputted from terminal DIO4 and the M sequence data stored in the memory 110*b* and judges whether the matching bit count of the two M sequence data is equal to or more than a predetermined threshold value (predetermined reception level). The predetermined threshold value (predetermined reception level) is the same as that for the cancellation unit 20 mentioned earlier. Further, the computation processing unit 110 (microprocessor 110*a*) compares the reception level inputted from terminal CMP with a predetermined threshold value (predetermined reception level). The predetermined threshold value (predetermined reception level) is also the same as that of the cancellation unit 20 mentioned earlier.

The computation processing unit 110 (microprocessor 110a) judges that M sequence data has been received when the matching bit count of the two M sequence data is equal to or more than a predetermined threshold value (predetermined reception level) and when the reception level is equal to or more than a predetermined threshold value (predetermined reception level) (Y in S3) and makes the transition from search mode to authentication mode. Further, the computation processing unit 110 (microprocessor 110a) receives the identification code and reception level of the cancellation unit 20, which are received after the M sequence data, from the wireless processing unit 120 (RFIC120a) (Y in S6), compares the received identification code and the identification code of the cancellation unit 20 stored in the memory 110b, and judges whether the reception level of the identification code is equal to or more than a predetermined threshold value (predetermined reception level) (S5). The predetermined threshold value (predetermined reception level) is the same as the threshold value of the reception level of the M sequence data (predetermined reception level).

When the two identification codes match and the reception level is equal to or more than the threshold value (predetermined reception level) (Y in S6), the computation processing unit 110 (microprocessor 110a) authenticates the cancellation unit 20. Further, the computation processing unit 110 (microprocessor 110a) transmits the identification code of the transmission unit 10 stored in the memory 110b to the cancellation unit 20 via the wireless processing unit 120 (RFIC120a) (S9).

On the other hand, the computation processing unit 110 (microprocessor 110a) judges in step S3 that the M sequence data has not been received when the matching bit count of the two M sequence data is less than a predetermined threshold value (predetermined reception level) or the reception level is less than a predetermined threshold value (predetermined reception level) (N in S3) and outputs a warning signal to the cellular phone 30. Further, the computation processing unit 110 (microprocessor 110a) outputs the warning signal to the cellular phone 30 when the identification code signal of the cancellation unit 20 is not received in step S4 (N in S4), or when the two identification codes do not match or the reception level of the identification code is less than the threshold value (predetermined reception level) in step S6 (N in S6).

Upon receiving the identification code signal transmitted by the transmission unit 10 (Y in S24) after the transmission of the identification code signal (S23) the wireless processing unit 220 (RFIC220a) of the cancellation unit 20 supplies the received identification code and reception level to the computation processing unit 210 (microprocessor 210a).

The computation processing unit 210 (microprocessor 210a) compares the identification code supplied by the wireless processing unit 220 (RFIC220a) with the identification code of the transmission unit 10 stored in the memory 210b and judges whether the reception level of the identification code is equal to or more than the predetermined threshold value (predetermined reception level) (same as the threshold value of the reception level of the M sequence data (predetermined reception level) (S25).

Further, when the two identification codes match and the reception level of the identification codes are equal to or more than the threshold value (predetermined reception level) (Y in S26), the computation processing unit 210 (microprocessor 210a) authenticates the transmission unit 10. As a result of establishing this authentication, the usage restrictions on the PDA40 are canceled (cancellation state is maintained) and the PDA40 is usable. On the other hand, when the identification codes do not match or the reception level is lower than the predetermined threshold value, the computation processing unit 210 (microprocessor 210a) affords the PDA40 an unusable state (S29).

The operation of the authentication mode of the transmission unit 10 and cancellation unit 20 may be performed only once (that is, N=1) and preferably a plurality of times (N>1). When the operation of the authentication mode is performed a plurality of times, the second time and on subsequent occasions it is possible to convert the identification code without sending the M sequence data. Therefore, the second time and on subsequent occasions, the processing from step S4 onwards is repeated by the transmission unit 10 and the processing from step S23 onward is repeated by the cancellation unit 20.

By repeating the authentication operation a plurality of times, the transmission unit 10 and cancellation unit 20 are able to more reliably authenticate each other (mutual authentication), whereby the level of security can be raised.

Further, when the authentication mode operation is performed a plurality of times, the identification code of the transmission unit 10 that is transmitted by the transmission unit 10 on each occasion may be the same or different. Similarly, the identification code of the cancellation unit 20 that is transmitted by the cancellation unit 20 on each occasion may be the same or different.

When the identification code is different, for example, in FIG. 16, in the first identification-code transmission and reception, the transmission unit 10 and cancellation unit 20 both transmit their own identification code to perform mutual authentication.

In the second identification-code transmission and reception, the cancellation unit 20 is pre-established with the transmission unit 10 and transmits a decoding key Ks stored in memory 210b as the identification code of the cancellation unit 20. The transmission unit 10 compares the decoding key Ks with a decoding key that is stored in the memory 110b of the transmission unit 10 and authenticates the cancellation unit 20 when the two decoding keys match.

Following authentication, the transmission unit 10 encodes its own identification code by means of the decoding key Ks and transmits the encoded identification code to the cancellation unit 20 as its own identification code. The cancellation unit 20 decodes the encoded identification code transmitted by the transmission unit 10 by means of the decoding key Ks, obtains the identification code of the transmission unit 10, and compares the identification code and the identification code of the transmission unit 10 stored in the memory 21b. The cancellation unit 20 authenticates the transmission unit 10 when the two identification codes match and the reception level from the transmission unit 10 is equal to or more than a predetermined level and cancel the usage restrictions. Usage of the device is restricted when the identification codes do not match or when the reception level is less than a predetermined level.

By performing the authentication a plurality of times (two times here) in this way, the security level can be raised and, by changing the identification code each time, a third party can be prevented from easily learning the identification code.

Following authentication mode, the computation processing unit 110 (microprocessor 110a) of the transmission unit 10 returns to step S1 and repeats the processing from the step S2 onward aftertime S has elapsed. Similarly, the computation processing unit 210 (microprocessor 210a) of the cancellation unit 20 returns to step S21 after authentication mode and enters the standby mode. As a result, full-time authentication in which authentication processing is repeated in time interval S is executed and, when mutual authentication is established, the PDA 40 maintains the usable state and, when mutual authentication is not established, the PDA 40 enters an unusable state. As a result, the outflow of information from the PDA 40 due to loss or theft or the like can be prevented. Further, time S is preferably about a few seconds to several tens of seconds from the perspective of effectively preventing the outflow of information from the PDA 40.

Other Usage Example of Authentication Card

Figure 17:
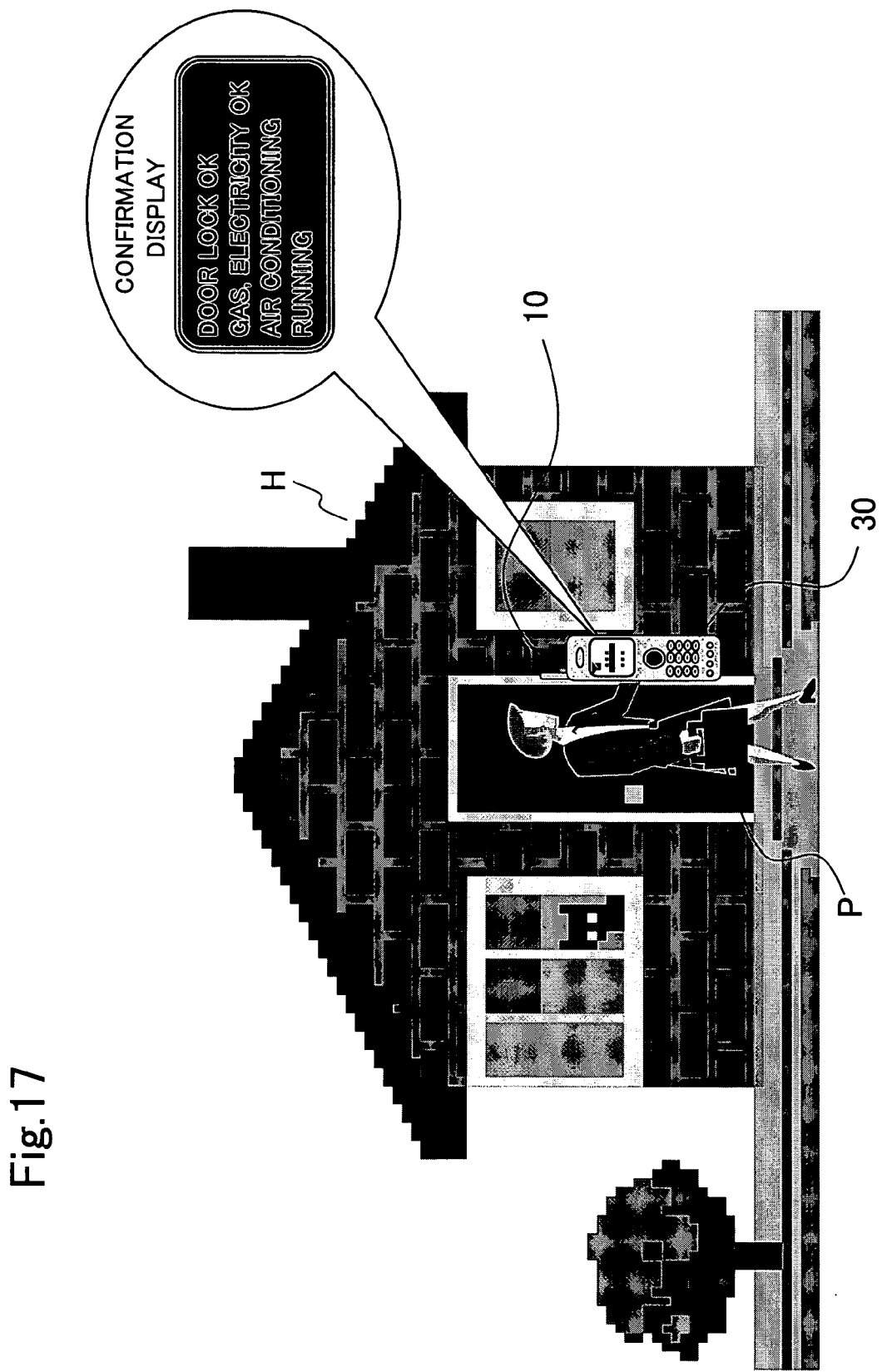
FIG. 17 shows an example in which an authentication card is used for home security.

Another usage example of the authentication card of the embodiment of the present invention will be described next. FIG. 17 shows an example in which an authentication card is used for home security.

The owner P takes possession of the cellular phone 30 and a new authentication card 1 is inserted in the cellular phone 30. Meanwhile, although not illustrated, the child authentication card 2 is inserted in the door lock (electronic lock) of an entry door to a residence H of an owner P. The transmission unit 10 of the authentication card 1 and cancellation unit 20 of the authentication card 2 of either of the first and second embodiments may be used here.

In order to prevent the authentication card 2 from being taken by a third party, the authentication card 2 is preferably inserted on the inside of the entry door.

When the owner P that is carrying the cellular phone 30 in which the authentication card 1 has been inserted leaves the residence H and moves more than a predetermined distance (several meters, for example) away from the authentication card 2, mutual authentication of the transmission unit 10 of the authentication card 1 and cancellation unit 20 of the authentication card 2 is performed as mentioned earlier. As a result, the cancellation unit 20 terminates the usage restriction cancellation signal and the door lock enters a state in which same cannot be unlocked (locked state). On the other hand, when the transmission unit 10 and cancellation unit 20 are within a predetermined distance when the owner returns home or is at home, mutual authentication of the transmission unit 10 and cancellation unit 20 is performed. As a result, the cancellation unit 20 issues a usage restriction cancellation signal to the door lock and the door lock enters a state of being capable of being locked and unlocked.

In a state where the transmission unit 10 and cancellation unit 20 are within the predetermined distance and mutual authentication has been performed, the transmission unit 10 is able to transmit an operating command to the cancellation unit 20. For example, in a door lock state (whether locked or not) and the door lock is connected via a home network to a device such as a gas burner, lighting device, or air conditioner, the transmission unit 10 is able to transmit a command to request the states of these devices. Further, commands to remotely operate these devices can also be transmitted.

The cancellation unit 20 can also transmit operating commands that are transmitted by the transmission unit 10 to devices connected to the door lock or home network. The command execution results can also be sent back to the transmission unit 10. For example, when an operating command is a door-lock state request command, the locked or unlocked state of the door lock is sent back to the transmission unit 10.

As a result of the owner P operating the input key of the cellular phone 30, an operating command is first inputted to the cellular phone 30 and supplied by the cellular phone 30 to the transmission unit 10. After being received by the transmission unit 10, the result of the command execution is supplied by the transmission unit 10 to the cellular phone 30 and displayed on the display apparatus of the cellular phone 30. As a result, the owner P is able to perform a remote operation on a device within the residence by means of the cellular phone 30 and is able to reliably confirm the remote operation results via the cellular phone 30.

The transmission of the operating commands and command execution results can be performed by using the interval from the time mutual authentication is performed and the next mutual authentication is performed.

Figure 18:
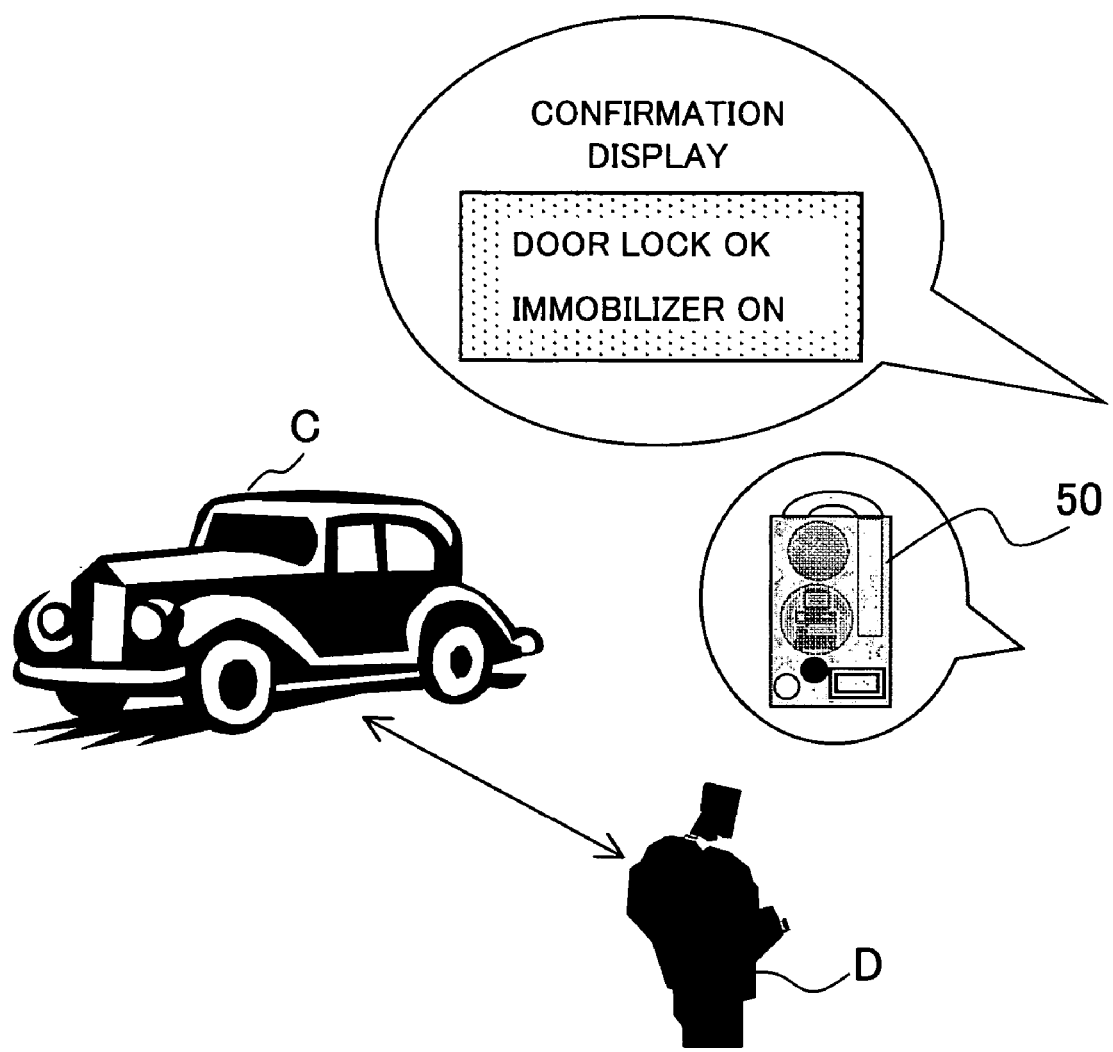
FIG. 18 shows an example in which the authentication card is inserted in an automobile key that is carried by the driver (owner) of the automobile and the authentication card is inserted in a door lock of an automobile C.

FIG. 18 shows an example where authentication card 1 (not shown in FIG. 18) is inserted in the automobile key 50 that is carried by a driver (owner) D of automobile C and authentication card 2 (not shown in FIG. 18) is inserted in the door lock of automobile C.

When the driver D carries the automobile key 50 and moves more than a predetermined distance away from automobile C, mutual authentication between the authentication cards 1 and 2 is not performed and the cancellation unit 20 of the authentication card 2 establishes a state for the automobile door lock in which same cannot be unlocked. On the other hand, when the driver D is within the predetermined distance, mutual authentication of the transmission unit 10 and cancellation unit 20 is possible and the cancellation unit 20 is able to lock and unlock the door lock.

Further, similarly to the home security case mentioned earlier, when the cancellation unit 20 is connected to an installed device of automobile C (car air conditioner, car stereo or the like) in addition to the door lock, the states of the door lock and installed devices are transmitted to the transmission unit 10 and the transmission unit 10 is also able to display the states on the display apparatus of the automobile key 50.

The authentication cards 1 and 2 can be used for a variety of security applications.

INDUSTRIAL APPLICABILITY

The present invention can be used for memory cards that can be inserted in cellular phones, PDA, notebook computers, cameras, automobile keys, and door locks and so forth.

The invention claimed is:

1. An authentication card, which is installable in a portable apparatus that is carried by an owner, and that performs wireless authentication for another authentication card that is installed in another apparatus, the authentication card comprising:

a storage portion for storing data of a call signal, an identification code of the authentication card, and an identification code of the other authentication card;

a transmission portion that transmits the stored data of the call signal or the stored data of the call signal and the stored identification code of the authentication card by means of a wireless signal having a predetermined transmission level;

a reception portion for receiving the identification code of the other authentication card that is transmitted by means of a wireless signal from the other authentication card in response to the transmission of the transmission portion;

a judgment portion for judging whether a signal level of the transmitted identification code received by the reception portion is equal to or greater than a predetermined value and for judging whether the identification code received by the reception portion matches the identification code of the other authentication card stored in the storage portion; and a warning portion that outputs a warning signal to the portable apparatus upon, as a result of the judgment by the judgment portion, the level of the transmission of the identification code received by the reception portion being less than the predetermined value and upon the identification code received by the reception portion and the identification code of the other authentication card stored in the storage portion not matching.

2. The authentication card according to claim 1, wherein the transmission portion transmits only the data of the call signal stored in the storage portion, and the authentication card further comprises:
an identification code transmission portion that transmits the identification code of the authentication card stored in the storage portion by means of a wireless signal of a predetermined transmission level when the judgment portion judges that the reception level of the identification code received by the reception portion is equal to or greater than the predetermined value and the identification code received by the reception portion and the identification code of the device authentication card stored in the storage portion match.

3. The authentication card according to claim 1, wherein the call signal is an M sequence signal or a binary pseudo-random signal containing a C/A code, P code or a linear FM signal.

4. The authentication card according to claim 1, further comprising:
a connection portion that forms an electrical connection with the portable apparatus as a result of being installed in the portable apparatus, renders the level of a predetermined signal of the portable apparatus a first level by forming the electrical connection and renders the level of the predetermined signal a second level as a result of being removed from the portable apparatus and the electrical connection being broken,
wherein the portable apparatus is in an unusable state as a result of the level of the predetermined signal being the second level.

5. The authentication card according to claim 4, wherein, for the unusable state of the portable apparatus, the portable apparatus turns off the supply of power from the power supply of the portable apparatus to the constituent elements of the portable apparatus to be in a state where inputs to the portable apparatus are not accepted or erases the content of the memory of the portable apparatus.

6. The authentication card according to claim 1, wherein the authentication card is a memory stick, SD memory card, or multimedia card.

7. An authentication card that is installable in one of a plurality of first apparatus including an information apparatus, a home electronic lock apparatus, and an automobile electronic lock apparatus and that performs wireless authentication for a another authentication card that is installed in a second apparatus that is portable and carried by an owner, the authentication card comprising:
a storage portion for storing data of a call signal, an identification code of the authentication card, and an identification code of the other authentication card;
a reception portion for receiving a wireless signal from the other authentication card;
a first judgment portion for performing:
a first judgment to judge whether the reception portion receives a wireless signal within a predetermined time,
a second judgment to judge, when the reception portion receives a wireless signal within the predetermined time, whether a signal matching the call signal stored in the storage portion is contained in the wireless signal, and
a third judgment to judge whether a signal level of the received wireless signal is equal to or greater than a predetermined value; and
a signal output portion for outputting a signal to put the first apparatus in which the authentication card is installed in an unusable state based upon at least one of the first, the second, and the third judgments by the first judgment portion.

8. The authentication card according to claim 7, wherein, when the wireless signal received by the reception portion contains only the call signal, the third judgment by the first judgment portion is whether the signal level of the received call signal is equal to or greater than the predetermined level and, when the wireless signal received by the reception portion contains the call signal and the identification code of the other authentication card installed in the second apparatus, the third judgment by the first judgment portion is whether the signal level of the received wireless signal including the identification code of the other authentication card is equal to or greater than the predetermined level.

9. The authentication card according to claim 7, further comprising:
a transmission portion that transmits the call signal and the identification code of the authentication card stored in the storage portion by means of a wireless signal of a predetermined level when all the judgments by the judgment portion are established.

10. The authentication card according to claim 9, further comprising:
an identification code reception portion for receiving the identification code of the other authentication card installed in the second apparatus transmitted in response to the transmission by the transmission portion; and
a second judgment portion that judges whether the identification code received by the identification code reception portion matches the identification code of the other authentication card stored in the storage portion and judges whether the signal level of the received wireless signal including the identification code is equal to or greater than a predetermined level,
wherein the signal output portion outputs a signal for putting the device in an unusable state to the device when at least one of the two judgments is not established as a result of the judgment by the second judgment portion.

11. The authentication card according to claim 7,
wherein the call signal is an M sequence signal or a binary pseudo-random signal containing a C/A code, P code or a linear FM signal.

12. The authentication card according to claim 7, further comprising:
a connection portion that forms an electrical connection with the first apparatus as a result of being installed in the first apparatus, renders the level of a predetermined signal of the device a first level by forming the electrical connection and renders the level of the predetermined signal a second level as a result of being removed from the device and the electrical connection being broken,
wherein the first apparatus is put in an unusable state by the first apparatus as a result of the level of the predetermined signal being the second level.

13. The authentication card according to claim 7,
wherein unusable states include states where a content of a memory of the second apparatus is erased, a supply of power from a power supply of the first apparatus to the constituent elements of the first apparatus is turned off, or inputs to the second apparatus are not accepted.

14. The authentication card according to claim 7, wherein the authentication card is a memory stick, SD memory card, or multimedia card.

15. A wireless authentication system comprising a first authentication card that is installable in a portable apparatus carried by an owner and a second authentication card that is installed in another apparatus, and in which the first and second authentication cards perform mutual authentication, wherein the first authentication card comprises:
- a first storage portion for storing data of a call signal, a first identification code of the first authentication card and a second identification code of the second authentication card;
- a first transmission portion for transmitting the data of the call signal stored in the first storage portion or the call signal and first identification code stored in the storage portion by means of a wireless signal of a predetermined transmission level;
- a first reception portion for receiving the identification code of the second authentication card transmitted by means of a wireless signal from the second authentication card in response to the transmission of the first transmission portion;
- a first judgment portion for judging whether a signal level of the received wireless signal including the identification code received by the first reception portion is equal to or greater than a predetermined value and for judging whether the identification code received by the first reception portion matches the second identification code stored in the storage portion; and
- a warning portion for outputting a warning signal to the portable apparatus upon, as a result of the judgment by the first judgment portion, the signal level of the received wireless signal including the identification code received by the first reception portion being less than the predetermined value and upon the identification code received by the first reception portion not matching the second identification code stored in the storage portion, wherein the second authentication card comprises:
- a second storage portion for storing call signal data, the second identification code of the second authentication card, and the first identification code of the first authentication card;
- a second reception portion for receiving a wireless signal from the first authentication card;
- a second judgment portion for performing:
  - a first judgment to judge whether the second reception portion receives a wireless signal within a predetermined time,
  - a second judgment to judge whether, when the second reception portion receives a wireless signal within the predetermined time, a signal matching the call signal data stored in the second storage portion is contained in the wireless signal, and
  - a third judgment to judge whether the signal level of the wireless signal is equal to or greater than a predetermined level; and
- a signal output portion for outputting, to the apparatus, a signal to put the apparatus in an unusable state when at least one of the first to third judgments is not established as a result of the judgment by the second judgment portion.

\* \* \* \* \*